(12) United States Patent
Fukudome

(10) Patent No.: US 9,110,609 B2
(45) Date of Patent: Aug. 18, 2015

(54) PRINTING SYSTEM, INFORMATION PROCESSING DEVICE, AND NON-TRANSITORY COMPUTER READABLE RECORDING MEDIUM FOR CONTROLLING PRINTING PROCESS BY APPLYING A PRINTING RULE TO A PRINT JOB

(71) Applicant: KONICA MINOLTA, INC., Chiyoda-ku (JP)

(72) Inventor: Kenji Fukudome, Kawabe-gun (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/335,075

(22) Filed: Jul. 18, 2014

(65) Prior Publication Data
US 2015/0029547 A1 Jan. 29, 2015

(30) Foreign Application Priority Data
Jul. 26, 2013 (JP) .................................. 2013-155271

(51) Int. Cl.
G06F 3/12 (2006.01)
(52) U.S. Cl.
CPC ............ *G06F 3/1204* (2013.01); *G06F 3/1256* (2013.01); *G06F 3/1288* (2013.01)
(58) Field of Classification Search
CPC .... G06F 3/1204; G06F 3/1256; G06F 3/1288
USPC ....................................... 358/1.15
See application file for complete search history.

(56) References Cited

U.S. PATENT DOCUMENTS

| 8,345,277 | B2* | 1/2013 | Emori ........................ 358/1.14 |
| 8,542,374 | B2* | 9/2013 | Nakata ........................ 358/1.14 |
| 2008/0239381 | A1* | 10/2008 | Oshima ........................ 358/1.15 |
| 2009/0059279 | A1* | 3/2009 | Sakurai ........................ 358/1.15 |
| 2011/0043848 | A1* | 2/2011 | Nuggehalli et al. ......... 358/1.15 |
| 2013/0135673 | A1 | 5/2013 | Murakawa | |
| 2013/0321854 | A1* | 12/2013 | Kimura ........................ 358/1.14 |
| 2015/0029548 | A1* | 1/2015 | Fukudome .................. 358/1.15 |

FOREIGN PATENT DOCUMENTS

| JP | 2006-338237 A | 12/2006 |
| JP | 2009-140429 A | 6/2009 |
| JP | 2013-114288 A | 6/2013 |

* cited by examiner

*Primary Examiner* — Benny Q Tieu
*Assistant Examiner* — Quyen V Ngo
(74) *Attorney, Agent, or Firm* — Buchanan Ingersoll & Rooney PC

(57) ABSTRACT

An information processing device includes: a rule acquiring part for acquiring a printing rule from a print server; a job generating part for generating a print job containing header information showing settings of the print job and sending the generated print job to the print server; an initial determination part for making an initial determination to determine whether or not the printing rule is applied to the print job generated by the job generating part based on the header information of the print job and displaying a result of the initial determination on a display part; and a job controlling part for continuing a process on the print job in response to a user instruction to continue, and suspending the process on the print job in response to a user instruction to suspend after the result of the initial determination is displayed on the display part.

27 Claims, 15 Drawing Sheets

FIG. 2

RULE INFORMATION 6

| PRINTING RULE (6a) | APPLICATION USER (6b) | PRINTING RULE APPLYING JOB (6c) | PRINTING RULE APPLICATION PROCESS (6d) | EXEMPTION FROM APPLICATION OPTION (6e) |
|---|---|---|---|---|
| A | ... | PRINT JOB CONTAINING MORE THAN 10 PAGES | PRINT TWO PAGES ON A SINGLE SHEET | ALLOW |
| B | ... | PRINT JOB SENT BETWEEN 12:00PM AND 1:00PM | REMAIN ON HOLD AND PRODUCE PRINTED OUTPUT AT 1:00PM | ALLOW |
| C | ... | PRINT JOB SENT FROM SIXTH FLOOR | PRINT DOUBLE SIDED | ALLOW |
| D | ... | PRINT JOB GENERATED BY DOCUMENT APPLICATION | DISPLAY PAGE NUMBER ON EACH PAGE | ALLOW |
| E | ... | PRINT JOB GENERATED BY PRESENTATION APPLICATION | PRINT IN FULL COLOR | ALLOW |
| F | ... | PRINT JOB GENERATED BY EMAIL APPLICATION | PRINT IN BLACK AND WHITE | ALLOW |
| G | ... | PRINT JOB ONLY CONTAINING PAGES IN BLACK AND WHITE | PRINT BY SPECIALIZED BLACK AND WHITE MACHINE | ALLOW |

PRINTING SYSTEM, INFORMATION PROCESSING DEVICE, AND NON-TRANSITORY COMPUTER READABLE RECORDING MEDIUM FOR CONTROLLING PRINTING PROCESS BY APPLYING A PRINTING RULE TO A PRINT JOB

This application is based on the application No. 2013-155271 filed in Japan, the contents of which are hereby incorporated by reference.

BACKGROUND OF THE INVENTION

1. Field of the Invention

The present invention relates to a printing system, an information processing device and a non-transitory computer readable recording medium. The present invention more specifically relates to a technique of controlling printing process by applying a printing rule to a print job on a print server.

2. Description of the Background Art

For producing a printed output such as a document, a rule which is registered in advance is conventionally applied based on information included in a print job and the printed output is produced in accordance with a result of application of the printing rule. The printing rule defining print settings for each print purpose is registered in advance with a printer. This known technique is introduced for example in Japanese Patent Application Laid-Open No. JP 2006-338237 A. According to this known technique, in response to receiving the print job, the printer specifies the print purpose based on template information included in the received print job. The printer applies the printing rule corresponding to the specified print purpose and configures the print settings such as printing double sided and/or printing multiple pages on a single sheet, thereby producing the printed output.

When producing the printed output by applying the printing rule to the print job, the printed output is sometimes produced in a way a user does not intend. It is assumed, for instance, that the conventional printing rule is applied to the print job as described above to automatically configure settings to print double sided and two pages on a single sheet. In this case, even though the user intends to have the printed output with one page of the document to print printed on one side of the whole sheet, the document is forcibly printed double sided and two pages on the single sheet. In such a case, the printed output is not produced in a way the user intends. Therefore, the printed output may be wasted, and a purpose of the printing rule to cut printing costs cannot be achieved.

In order to solve the above-described problems, when receiving the print job, for example, the printer should make the user check by showing the result of applying the printing rule before starting a process proceeded by applying the printing rule to the print job. In this case, the user is allowed to determine whether or not to continue printing after checking the result of applying the printing rule, so this may prevent the printed output from being wasted.

In these days, the printing rules applied to the print jobs have likely to become diversified. It is assumed, for example, the printing rule to print two pages on a single sheet if the printed output produced with the print job exceeds a predetermined number of pages may be registered. When such a printing rule is registered, the number of pages of the printed output to be produced needs to be detected by analyzing whole data included in the received print job before determining whether or not to apply the printing rule to the print job.

When the print job has a large size of data, it may require a long time to complete receiving the job. In this case, it also requires a long time to analyze the data included in the print job. This may require an extremely long time to show the user who sends the print job the result of applying the printing rule. Therefore, this may make the user wait for the extremely long time to see the result of applying the printing rule. Some users may move to the installation site of the printer and wait to have the printed output after sending the print job without noticing the displayed result of application of the printing rule because a screen does not change even at a later time. In such a case, even if the user waits for a long time in front of the printer, printing does not start, so the user wastes a time and energy.

SUMMARY OF THE INVENTION

The present invention is intended to solve the above problems. Thus, the present invention is intended to provide a printing system, an information processing device and a non-transitory computer readable recording medium capable of eliminating wasting time by rapidly showing a result of applying a printing rule to a user who has given a print job when a printed output is produced by applying the printing rule.

First, the present invention is directed to a printing system comprises an information processing device and a print server. A printing rule registered in advance with the print server is applied to a print job sent from the information processing device and a process defined in the printing rule is performed so that printing process is controlled.

According to an aspect of the printing system, the print server includes: a printing rule storing part for storing the printing rule; and a rule transmitting part for sending printing rule stored in the printing rule storing part to the information processing device. The information processing device includes: a display part on which a variety of information is displayed; a rule acquiring part for acquiring the printing rule sent from the print server; a job generating part for generating the print job containing job information and header information showing settings of the print job and sending the generated print job to the print server in response to a user instruction to print; an initial determination part for making an initial determination to determine whether or not the printing rule acquired by the rule acquiring part is applied to the print job generated by the job generating part based on the header information generated by the job generating part and displaying a result of the initial determination on the display part; and a job controlling part for continuing a process on the print job generated by the job generating part in response to a user instruction to continue when the user instruction to continue is given, and suspending the process on the print job generated by the job generating part in response to a user instruction to suspend when the user instruction to suspend is given after the result of the initial determination is displayed on the display part.

Second, the present invention is directed to an information processing device sending a print job to a print server capable of controlling printing process by applying a printing rule to the print job.

According to one aspect of the information processing device, the information processing device comprises: a display part on which a variety of information is displayed; a rule acquiring part for acquiring the printing rule from the print server; a job generating part for generating the print job containing job information and header information showing settings of the print job and sending the generated print job to the print server in response to a user instruction to print; an initial determination part for making an initial determination to determine whether or not the printing rule acquired by the rule acquiring part is applied to the print job generated by the job generating part based on the header information generated by the job generating part and displaying a result of the initial determination on the display part; and a job controlling part for continuing a process on the print job generated by the job generating part in response to a user instruction to continue when the user instruction to continue is given, and suspending the process on the print job generated by the job generating part in response to a user instruction to suspend when the user instruction to suspend is given after the result of the initial determination is displayed on the display part.

Third, the present invention is directed to a non-transitory computer readable recording medium on which a program is recorded. The program is executable on a an information processing device capable of sending a print job containing header information and job information to a print server capable of controlling a printing process by applying a printing rule to the print job.

According to an aspect of the non-transitory computer readable recording medium, the program is executed on the information processing device to function as a system comprising: a rule acquiring part for acquiring the printing rule from the print server; an initial determination part for acquiring the header information showing settings of the print job generated in response to a user instruction to print, making an initial determination to determine whether or not the printing rule acquired by the rule acquiring part is applied to the print job generated in response to the instruction to print based on the header information and displays a result of the initial determination on a predetermined display part; and a job controlling part for continuing a process on the print job generated in response to the instruction to print when the user instruction to continue is given, and suspending the process on the print job generated in response to the instruction to print when the user instruction to suspend is given after the result of the initial determination is displayed on the display part.

BRIEF DESCRIPTION OF THE DRAWINGS

FIG. 2 is an example of rule information;

FIG. 12 is the exemplary sequence diagram of the process performed when the information processing device acquires the printing rule from the print server in response to being powered on;

DESCRIPTION OF THE PRESENT PREFERRED EMBODIMENTS

Figure 1:
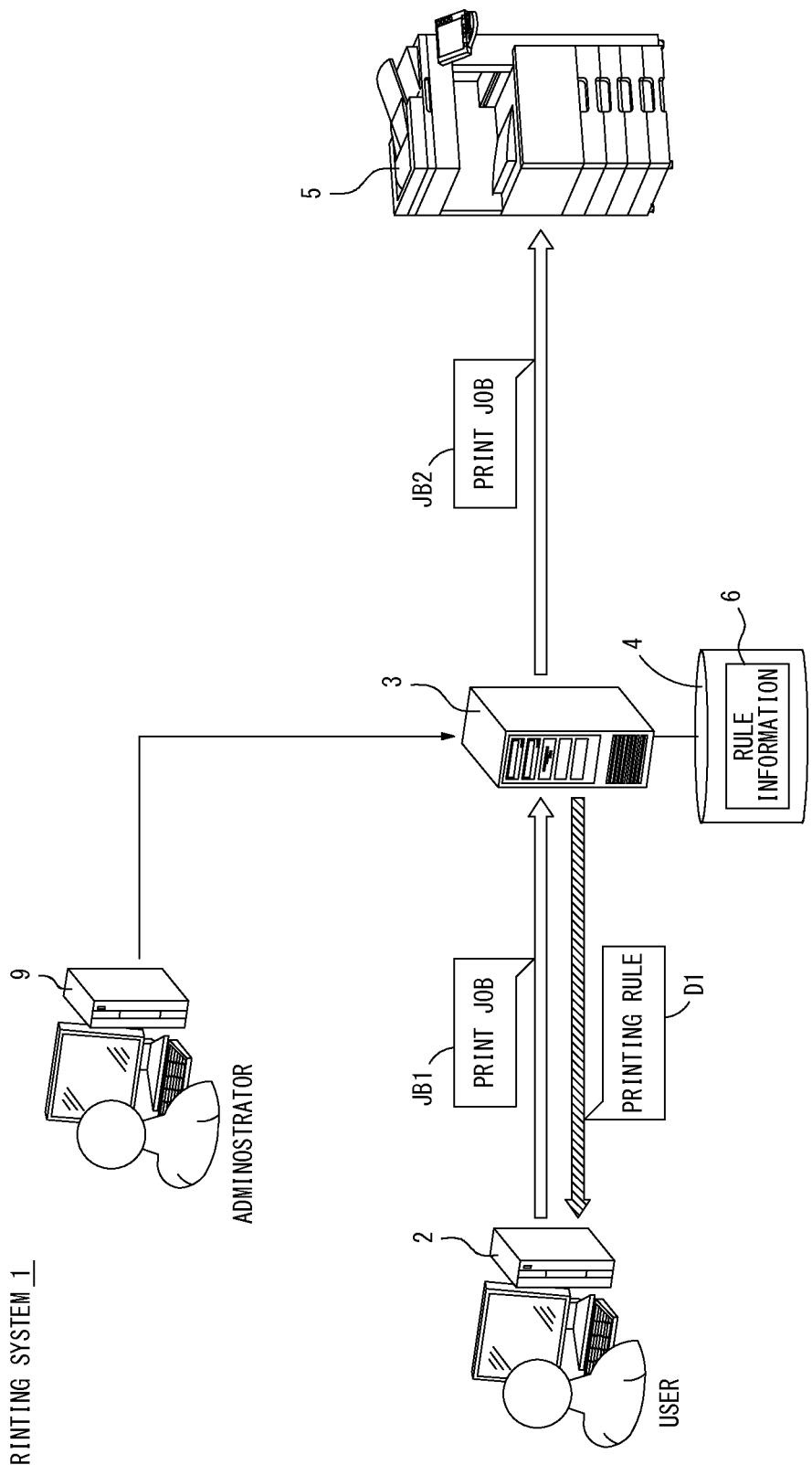
FIG. 1 shows an exemplary configuration of a printing system.

Preferred embodiments of the present invention are described in detail below with reference to figures. In the description given below, those elements which are shared in common among figures are represented by the same reference numerals, and these elements are not discussed repeatedly for the same description.

(First Preferred Embodiment)

FIG. 1 shows an exemplary configuration of a printing system 1 of the first present preferred embodiment of the present invention. The printing system 1 is a network system comprising more than one information processing device 2 and 9, a print server 3 and an image forming device 5. This network system is established in an office, for instance, to perform printing process. On the printing system 1, each of the information processing devices 2 and 9, the print server 3 and the image forming device 5 is capable of establishing wired or radio data communication over a network such as LAN (Local Area Network).

The information processing devices 2 and 9 are formed from general computers (PC), for example. With the information processing device 2 of the information processing devices, the user edits and creates a document to print, for instance, and outputs a print job JB1 to the print server 3. The information processing device 9 is used by an administrator to register various types of information with the print server 3. The information processing device 2 may be used by each user.

The image forming device 5 is formed from a device such as one of MFPs (Multifunction Peripherals). The image forming device 5 includes print function to produce a printed output by forming images on a printing sheet, for instance, based on the print job input over the network. The image forming device 5 is equipped with multiple colors of toners or inks. When the input job specifies printing in color, the image forming device 5 forms images with multiple colors to print in color. When the input print job specifies printing in black and white, the image forming device 5 forms images with only black to print in black and white. The image forming device 5 is also capable of automatically printing multiple pages of a document in a single sheet or printing double sided, for example, based on the print settings of the input print job. Furthermore, the image forming device 5 is capable of adding a certain image (such as watermarks or character strings) for printing based on the print settings.

Although in the example of FIG. 1, only one image forming device 5 is installed, the number of the image forming device 5 is not always only one. To be more specific, more than one image forming device 5 may be installed on the printing system 1. In such a case, different type of the image forming device 5 may be included in the more than one image forming device 5. The printing system 1 may comprise a color output device that is capable of printing both in color and black and white and a black and white device that is only equipped with a black toner or ink.

The print server 3 centrally controls the print job JB1 output from the information processing device 2 of the printing system 1 and outputs to the image forming device 5 after applying the printing rule to the print job JB1, thereby controlling printing to meet conditions for output defined in advance in the printing rule. The conditions for output defined in the printing rule include a variety of conditions. The condition to change the print settings of the print job JB1 to a predetermined state and print or to designate certain image forming device 5 and print may be included when there is more than one image forming device 5, for example.

In response to receiving the print job JB1 from the information processing device 2, the print server 3 determines the printing rule to apply to the print job JB1. The print server 3, based on the determination result, applies the printing rule to the print job JB1 and changes the print settings of the print job JB1 or the device to which the print job JB1 is output. More specifically, the print server 3 automatically converts the input print job JB1 to a print job JB2 to which the printing rule is applied. The print server 3 then outputs the print job JB2 to which the printing rule is applied to the image forming device 5.

The print server 3 includes a nonvolatile storage device 4 formed from a device such as a hard disk device. The storage device 4 is capable of temporarily storing therein the print job JB1 received by the print server 3. The storage device 4 also serves as a printing rule storage part in which rule information 6 is stored. A variety of printing rules registered in advance by the administrator are stored as the rule information 6. The administrator uses the information processing device 9 to register the rule information 6 with the print server 3.

At least one printing rule is registered as the rule information 6. FIG. 2 is an example of the rule information 6. More than one printing rule may be registered as the rule information 6. In the example of FIG. 2, seven rules, printing rules A to G are registered. The rule information 6 contains information 6a to 6e as items recorded for each printing rule. The items are the printing rule 6a as which information such as a name to identify the printing rule is registered, the application user 6b as which the user to whom the printing rule is applied is recorded, the printing rule applying job 6c as which the job to which the printing rule is applied is recorded, the printing rule application process 6d as which process proceeded in accompanied with application of the printing rule is recorded and the exemption from application option 6e as which whether or not the option to exempt from application of the printing rule is available is recorded.

The printing rule A, for instance, is the rule defines to change the print settings of the print job JB1 to print two pages on a single sheet and produce the printed output when the received print job JB1 contains more than 10 pages. The setting to print two pages on a single sheet specifies to automatically layout two pages of the document on a single sheet. The printing rule B defines to remain on hold (spool) the print job JB1 and produce the printed output at 1:00 PM when the print job JB1 is received between 12:00 PM and 1:00 PM. The printing rule C defines to change the print settings of the print job JB1 to print double sided and produce the printed output when the print job JB1 sent from a certain area (sixth floor) is received. The printing rule D defines to change the print settings of the print job JB1 to display the page number on each page and produce the printed output when the print job JB1 generated by a document application for document creation and/or edition is received. The printing rule E defines to change the print settings of the print job JB1 to print in full color and produce the printed output when the print job JB1 generated by a presentation application for creation and/or edition of data such as a presentation material is received. The printing rule F defines to change the print settings of the print job JB1 to print in black and white and produce the printed output when the print job JB1 generated by an email application for email receipt and transmission is received. The printing rule G defines to change the address to which the print job JB1 is output to the specialized black and white machine and produce the printed output when the print job JB1 only containing the pages in black and white is received.

For the application user 6b of each printing rule A to G, a user name or a user ID of the user to which the printing rule is applied is registered in advance and recorded. For the application user 6b, more than one user may be registered. Alternatively, only one user may be registered.

By referring to FIG. 2, the user is allowed to select the exemption from application for each printing rule A to G. To be more specific, when the exemption from application option 6e of the rule information 6 shows "allow," the user is allowed to select the exemption from application of the printing rule. When the exemption from application option 6e of the printing rule shows "banned," the user is not allowed to select the exemption from application of the printing rule. According to the first preferred embodiment, all the printing rules A to G allow the user to select the exemption from application of the printing rules. If, however, the administrator would like to make the option of the exemption from application unavailable to the user, he or she may change in advance the setting of the exemption from application option 6e to "banned."

Information registered in advance by the administrator is recorded as each item 6a to 6e registered for each printing rule with the rule information 6 of FIG. 2.

In response to receiving the print job JB1 over the network, the print server 3 makes determination to decide the printing rule to apply to the print job JB1 based on the above-described rule information 6. More specifically, the print server 3 identifies the user who has sent the print job JB1 and extracts all the printing rules applied to the identified user. The print server 3 then determines whether or not the received print job JB1 is the job to which any of the printing rules should be applied, thereby determining the printing rule to apply to the print job JB1. Through the determination, as the printing rule to apply to the print job JB1, multiple printing rules may be determined. The print server 3 carries out the printing rule application process set for the determined printing rule on the received print job JB1, thereby generating the print job JB2 that meets the printing rule and outputting it.

The printing rule is automatically applied to the print job JB1 on the print server 3, so that some printed outputs are produced in the way the user does not intend. In order to prevent that, the information processing device 2 of the printing system 1 of the first preferred embodiment, as illustrated in FIG. 1, is configured to acquire a printing rule D1 applied to the user from the print server 3, and it displays the result of applying the printing rule to the user before the printing process based on the job is started for sending the print job JB1 to the print server 3 so that the user is allowed to check in advance how the printed output is produced. The aforementioned printing system 1 is described in detail next.

Figure 3:
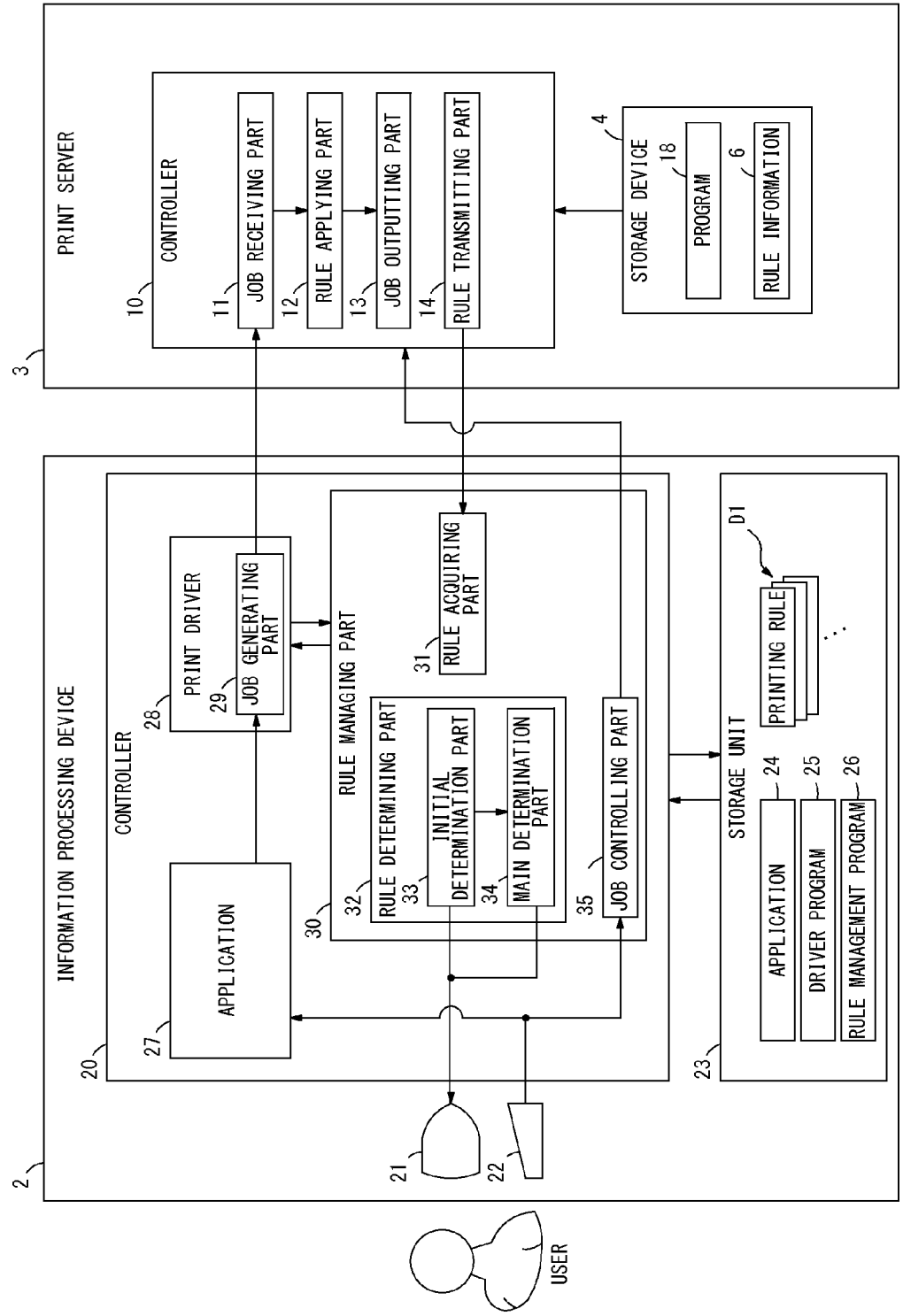
FIG. 3 is a block diagram showing an exemplary hardware configuration and functional configuration of the printing system.

FIG. 3 is a block diagram showing an exemplary hardware configuration and functional configuration of the printing system 1 of the first preferred embodiment. FIG. 3 does not show the image forming device 5 and the information processing device 9 used by the administrator.

As illustrated in FIG. 3, the information processing device 2 includes a controller 20, a display unit 21, a manipulation input unit 22 and a storage unit 23. The controller 20 includes a CPU (Central Processing Unit) and a memory. The display unit 21 is formed from a device such as a liquid crystal display, for example, and the manipulation input unit 22 is formed with parts such as a keyboard and/or mouse, for example. The storage unit 23 is formed from a device such as a hard disk device. The storage unit 23 stores therein a variety of programs installed in advance, and the programs are executed by the CPU of the controller 20. According to the first preferred embodiment, as illustrated in FIG. 3, application programs 24 including the document application, presentation application and the email application, a driver program 25 for generating the print job JB1 in response to the user instruction to print and a rule management program 26 for managing the printing rule applied to the user of the information processing device 2 are installed in advance on the storage unit 23. The CPU of the controller 20 executes the programs 24, 25 and 26, and the controller 20 serves as an application 27, a print driver 28 and a rule managing part 30.

The application 27 is brought into operation in response to startup of the application program 24 to perform process such as creation, edition or browse of data such as a document, a presentation material or an email to print in response to the user instruction.

The print driver 28 is brought into operation by the driver program 25 which is run in response to the user instruction as the application 27 is running, for example. The print driver 28 includes a job generating part 29. The job generating part 29 acquires the data to print specified by the user from the application 27 and generates the print job JB1 based on the acquired data to print, thereby sending the generated print job JB1 to the print server 3.

Figure 4:
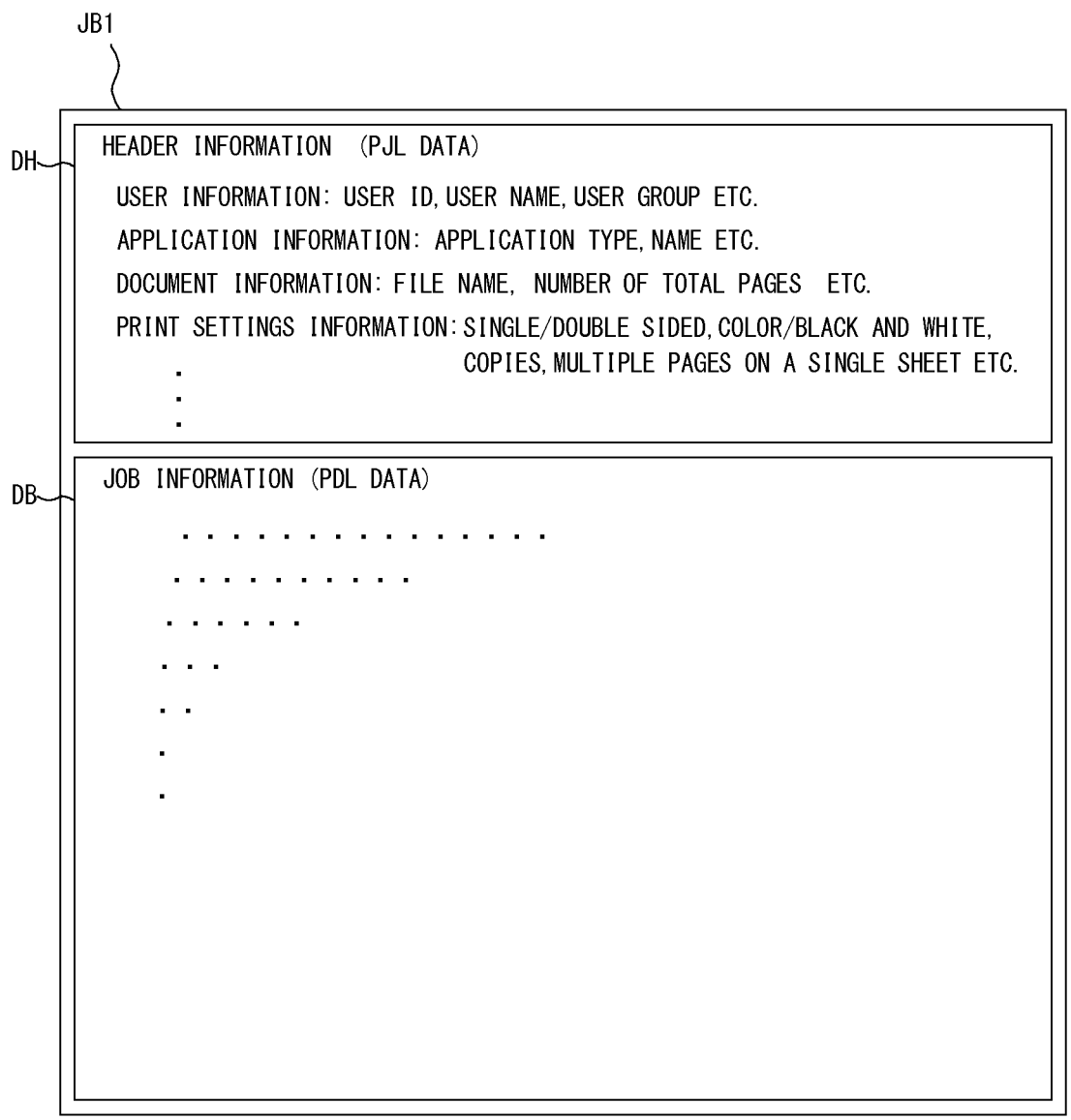
FIG. 4 shows an example of a data structure of a print job generated by a job generating part.

FIG. 4 shows an example of a data structure of the print job JB1 generated by the job generating part 29. As illustrated in FIG. 4, the print job JB1 generated by the job generating part 29 contains header information DH and job information DB. The header information DH is job adjunct information written in a language such as PJL (Print Job Language) data, for instance. The job information DB is for drawing information written in a language such as PDL (Page Description Language) data, for instance.

The header information DH contains a variety of information showing print settings, for instance, to make the initial determination of the printing rule which should be applied to the print job JB1. The header information DH is information containing user information, application information, document information and/or print settings information, for example. The user information is about the user who has given the print job JB1, and contains information for identifying the user like the user ID or the user name, for instance. The application information is about the application 27 by which the data to print is generated, and contains information such as a name or a type of the application. The document information is about the data to print, and contains information like a file name of the document to print or the number of total pages contained in the document to print, for example. The print settings information is about the print settings configured by the user, and contains information relating to settings for printing single/double sided, printing in color/black and white, the number of copies to be printed, and printing multiple pages on a single sheet like two pages on a single sheet, for example. The aforementioned various types of information are written between start information and end information, for instance, of the header information DH. For sending the header information DH to the print server 3, the variety of information is sent one after the other from the start information and the end information is sent at last.

The job information DB is body information of the job itself used for drawing at image formation by the image forming device 5. The job information DB contains image information of each page specified by the user to print. The job information DB written in PDL data, for instance, contains bitmap image information of each page specified as the data to print. The job information DB is not always written in PDL data. The job information DB may contain the image information written in vector data such as post script, for instance. As the job information DB contains the image information for drawing, the volume of information is much larger than the header information DH.

Referring back to FIG. 3, the rule managing part 30 becomes operative in response to startup of the rule managing program 26. After the information processing device 2 is powered on, for example, the rule managing program 26 is automatically read and executed by the controller 20. As the information processing device 2 is powered on and started up, the rule managing part 30 is resident in the controller 20. The rule managing part 30 is capable of monitoring the application 27 run by the controller 20 and performs operations in cooperation with the print driver 28.

As illustrated in FIG. 3, the rule managing part 30 includes a rule acquiring part 31, a rule determining part 32 and a job controlling part 35. The rule acquiring part 31 acquires a printing rule D1 applied to the user of the information processing device 2 from the print server 3 and stores in the storage unit 23.

After the print job JB1 is generated by the job generating part 29 of the print driver 28, the rule determining part 32 acquires the print job JB1 and determines the printing rule to be applied to the acquired print job JB1. More specifically, after the print job JB1 is generated by the job generating part 29, the rule determining part 32 reads the printing rule D1 acquired by the rule acquiring part 31 in the storage unit 23 and determines the printing rule to apply to the print job JB1. As illustrated in FIG. 3, the rule determining part 32 includes an initial determination part 33 and a main determination part 34. The initial determination part 33 is brought into operation at first and the main determination part 34 is the next.

The initial determination part 33 is brought into operation at first as the rule determining part 32 becomes operative. The initial determination part 33 acquires the header information DH in the print job JB1 when the header information DH is generated by the job generating part 29. The initial determination part 33 determines whether or not the job is the one to which any of the printing rule should be applied based on the header information DH, thereby making the initial determination of the printing rule to apply to the print job JB1. On the other hand, the main determination part 34 is brought into operation after the initial determination is made by the initial determination part 33. The main determination part 34 analyzes in detail the job information DB generated by the job generating part 29 and makes the main determination of the printing rule to apply to the print job JB1 based on both the header information DH and the job information DB. As described above, the initial determination part 33 of the rule determining part 32 becomes operative before the main determination part 34. The initial determination part 33 makes the initial determination to determine the printing rule to apply to the print job JB1 only based on the header information DH so that the result of the initial determination can be delivered promptly.

The right printing rule that should be applied to the print job JB1 cannot be always determined only through the initial determination. It is assumed, for example, there is the printing rule like the printing rule A as shown in FIG. 2 that is applied if the number of pages of the printed output produced by the print job JB1 is more than 10 pages. In this case, it cannot be determined accurately through the determination only based on the header information DH whether or not the printing rule should be applied to the print job JB1. That is because; the user may specify the print range and give the instruction to print only a part of pages. In such a case, although the header information DH contains the information as to the number of total pages of the document to print, it does not contain the information as to the number of pages to print specified by the user. In order to accurately determine whether or not the number of pages to print exceeds the predetermined number of pages, the number of pages to print needs to be counted by analyzing the image information for drawing contained in the job information DB.

It is assumed, for example, there is the printing rule like the printing rule G as shown in FIG. 2 that is applied if the printed output is only produced in black and white by the print job JB1. In this case, it cannot be determined accurately through the determination only based on the header information DH whether or not the printing rule should be applied to the print job JB1. That is because; the header information DH does not contain information showing if each page of the document is in black and white or color. In order to accurately determine whether or not the print job only contains the pages in black and white, it is necessary to determine whether or not all pages are in black and white by analyzing the image information for drawing contained in the job information DB in detail.

The main determination is carried out to accurately determine as described above, and the main determination part 34 is brought into operation after the initial determination is made by the initial determination part 33. As the job information DB is generated by the job generating part 29 after the header information DH, for example, the main determination part 34 analyzes sequentially the job information DB in parallel with the generating operation. After generating the job information DB and analyzing whole part of the job information DB, the main determination part 34 makes main determination to determine the printing rule to apply to the print job JB1 based on both the results of analysis of the header information DH and the job information DB. The above-described main determination allows realizing the accurate determination appropriate for the actual pages contained in the job information DB. The main determination by the main determination part 34 includes the detailed analysis of the job information DB so that it takes long to produce the result of the main determination after starting the main determination.

The initial determination part 33 displays the result of the initial determination on the display unit 21 soon after the result of the initial determination of the printing rule to apply to the print job JB1 based on the header information DH is produced. To be more specific, the initial determination part 33 displays the result of the initial determination on the display unit 21 relatively quickly after the job generating part 29 starts generating the print job JB1. The generation process of the print job JB1 by the job generating part 29 may not be completed. Even in such a case, the initial determination part 33 displays the result of the initial determination on the display unit 21 upon completion of generating the header information DH. Even if the main determination which takes long is not complete, the initial determination part 33 is capable of showing promptly the printing rule to be applied to the print job JB1 to the user who has given the print instruction.

After completing the main determination and producing the result of the main determination, the main determination part 34 displays the result of the main determination on the display unit 21. The result of the main determination may be the same as the one of the initial determination, and sometimes different from the one of the initial determination.

The job controlling part 35 controls the process corresponding to the print job JB1 generated by the job generating part 29 in response to the instruction given by the user through the manipulation input unit 22 as the result of the initial or main determination is displayed on the display unit 21 by the rule determining part 32. To be more specific, when the instruction to continue is input by the user, the job controlling part 35 continues with the process corresponding to the print job JB1 generated by the job generating part 29 in response to the instruction to continue. When the instruction to suspend is input by the user, the job controlling part 35 suspends the process corresponding to the print job JB1 generated by the job generating part 29 in response to the instruction to suspend. The print job JB1 generated by the job generating part 29 may have already been sent to the print server 3 at the time of controlling the process whether to continue or suspend. In such a case, the job controlling part 35 sends the instruction to continue or suspend based on the user instruction to the print server 3. Even when the main determination by the main determination part 34 has not complete yet, the user may give the instruction to continue or suspend by viewing the result of the initial determination. In this case, the job controlling part 35 determines whether to continue or suspend the process corresponding to the print job JB1 based on the user instruction and controls the later process corresponding to the print job JB1.

The print server 3 includes a controller 10 and the aforementioned storage device 4. The controller 10 includes a CPU and a memory. The storage device 4 stores therein in advance the above-described rule information 6 and a program 18 installed in advance. The program 18 is executed by the CPU of the controller 10. The CPU executes the program 18, and the controller 10 serves as a job receiving part 11, a rule applying part 12, a job outputting part 13 and a rule transmitting part 14.

The job receiving part 11 receives the print job JB1 from the information processing device 2. In response to receiving the print job JB1, the job receiving part 11 brings the rule applying part 12 into operation.

The rule applying part 12 applies the printing rule to the print job JB1 received by the job receiving part 11. The rule applying part 12 determines the printing rule to apply to the print job JB1 by the same way the aforementioned rule determining part 32 uses, and performs the printing rule applying process to apply the determined printing rule. The rule applying part 12 then converts the received print job JB1 to the print job JB2 which meets the printing rule. When the instruction to continue is received from the information processing device 2, the printing rule to apply to the print job JB1 may be specified by the instruction to continue. In this case, the rule applying part 12 performs the printing rule applying process to apply the specified printing rule, thereby converting the received print job JB1 to the print job JB2 which meets the specified printing rule. In response to receiving the instruction to continue from the information processing device 2, the rule applying part 12 outputs the print job JB2 obtained as a result of the printing rule applying process to the job outputting part 13. In response to receiving the instruction to suspend from the information processing device 2, the rule applying part 12 discards the print job JB1 or JB2 and does not proceed with the later process.

The job outputting part 13 outputs the print job JB2 converted to meet the printing rule to the image forming device 5. The job outputting part 13 outputs the print job JB2 to the address specified in the print job JB2. When the specialized black and white machine is designated as the address to which the print job JB2 is output, the job outputting part 13 outputs the print job JB2 to the specialized black and white machine.

The rule transmitting part 14 reads the rule information 6 in the storage device 4 and extracts the printing rule D1 which is applied to the user of the information processing device 2, then sending the extracted printing rule D1 to the information processing device 2. In response to receiving a request for printing rule from the information processing device 2, for example, the rule transmitting part 14 sends the printing rule D1 to the information processing device 2.

Concepts of data communication between each device on the above-described printing system 1 and each process performed by the device are described next.

Figure 5:
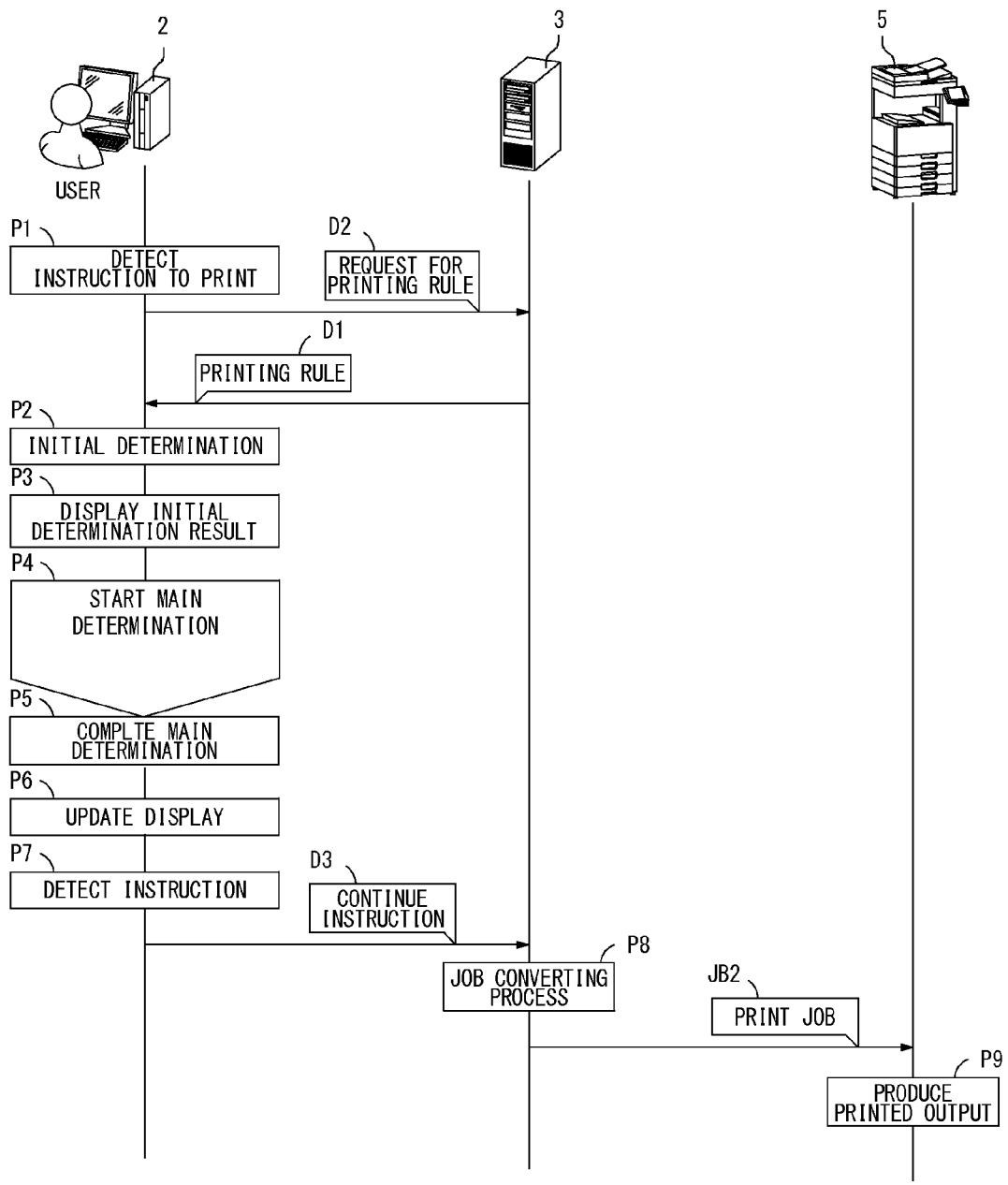
FIG. 5 is the exemplary sequence diagram of the process performed when a printed output is produced after completing a main determination on an information processing device.

FIG. 5 is the exemplary sequence diagram of the process performed when the printed output is produced after completing the main determination on the information processing device 2. After the user instruction to print is detected on the information processing device 2 (process P1), the print driver 28 becomes operative to start generating the print job JB1 and send to the print server 3. The information processing device 2 sends the request for printing rule D2 to the print server 3 in parallel with generating the print job JB1. The request for printing rule D2 thereby sent contains the information such as the user ID. In response to receiving the request for printing rule D2, the print server 3 extracts the printing rule D1 in the rule information 6 applied to the user of the information processing device 2 and sends the extracted printing rule D1 to the information processing device 2. The printing rule D1 sent to the information processing device 2 from the print server 3 may include more than one printing rule. When, for example, all the printing rules A to G as shown in FIG. 2 are applied to the user, the printing rule D1 contains the information about all the printing rules A to G.

After acquiring the printing rule D1 from the print server 3, the information processing device 2 makes the initial determination to determine the printing rule to be applied to the print job JB1 generated by the print driver 28 based on the header information DH in the print job JB1 (process P2). When the initial determination is complete, the information processing device 2 displays the result of initial determination on the display unit 21 (process P3).

Figure 6:
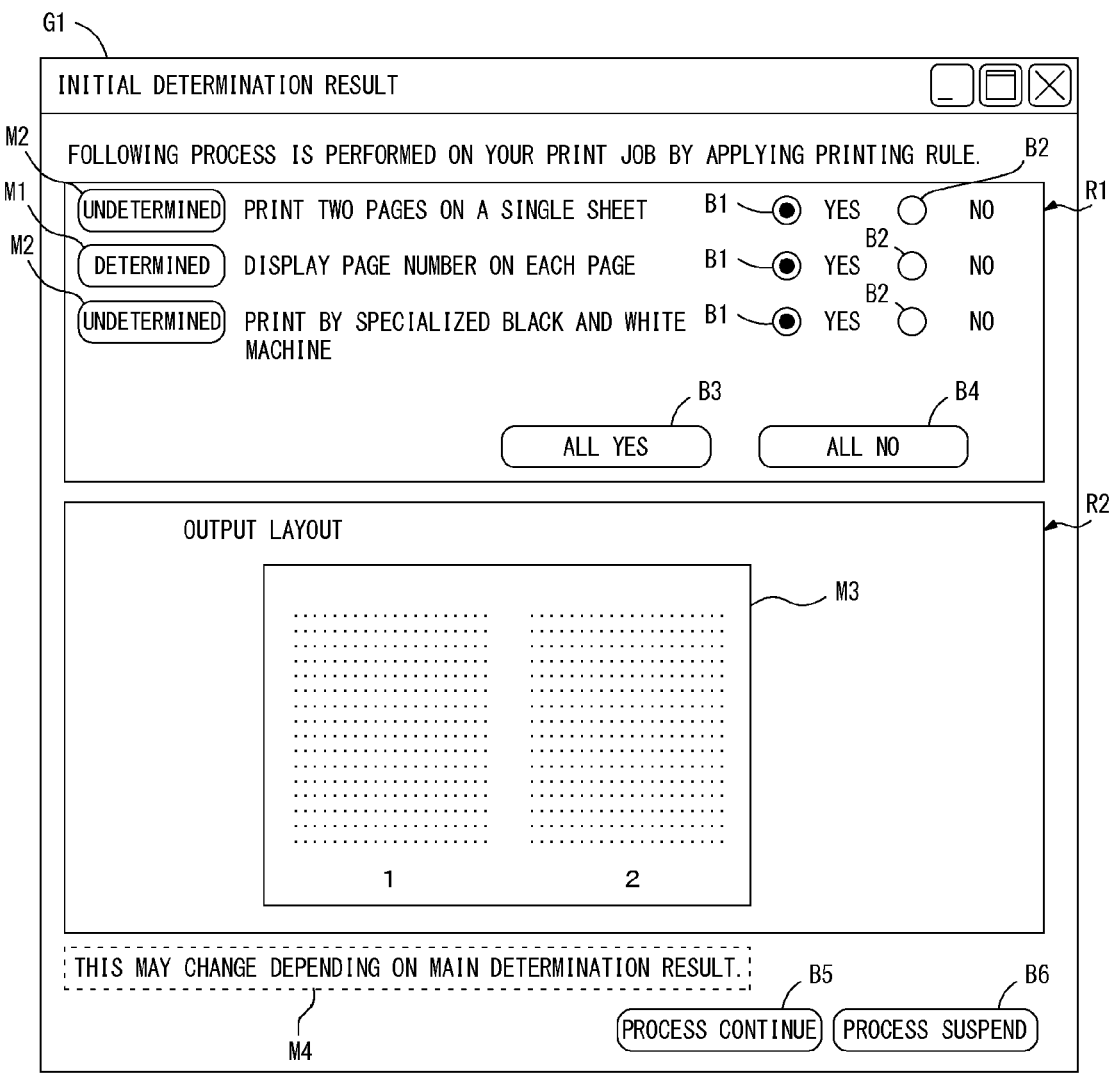
FIG. 6 is an example of an initial determination result screen displayed on the information processing device.

FIG. 6 is an example of an initial determination result screen G1 displayed on the information processing device 2. The initial determination result screen G1 is shown when the printing rules A, D and G of the seven printing rules A to G registered in the rule information 6 of FIG. 2 are applied to the print job JB1. The initial determination result screen G1 includes a rule displaying region R1 and a layout displaying region R2. The printing rule determined to be applied to the print job JB1 through the initial determination is shown in the rule displaying region R1, and the layout of the printed output to be produced when the printing rule determined through the initial determination is applied is shown in the layout displaying region R2. In the lower part of the layout displaying region R2, information M4 showing a possibility that the printing rule may change depending on the result of the later main determination because the printing rule is still not finally determined is additionally shown. By displaying the information M4, the information processing device 2 is allowed to notify the user of the possibility that the result of the initial determination may change. Also, in the lowest part of the initial determination result screen G1, a continue button B5 and a suspend button B6 are shown. The continue button B5 is pressed when the user would like to continue the process, and the suspend button B6 is pressed when the user would like to suspend the process.

In the rule displaying region R1, one or more printing rules determined to be applied to the print job JB1 through the initial determination are shown in a list form. Either of information M1 showing that the printing rule is finally determined to be applied to the print job JB1 at the point of the initial determination and information M2 showing that the printing rule is still not finally determined to be applied to the print job JB1 at the point of the initial determination is added to each printing rule displayed in a list form. In the example of FIG. 6, the information M2 showing that is still not finally determined is added to the printing rule A setting "printing two pages on a single sheet" and the printing rule G setting "printing in a specialized black and white machine." More specifically, it is necessary to analyze the job information DB to accurately determine whether or not to apply the printing rules A and G, and the initial determination cannot finally determine. The information M1 showing that is finally determined is added to the printing rule D setting "displaying the page number on each page and printing." More specifically, only by analyzing the header information DH, it may accurately determine whether or not to apply the printing rule D. The user, therefore, is allowed to find the printing rule D finally determined to be applied to the print job JB1 and the printing rules A and G not finally determined distinctively from each other of the printing rules A, D and G initially determined to be applied to the print job JB1.

Two buttons B1 and B2 by pressing one of which either-or choice can be made is added to the printing rule that is set to allow the user to select the exemption from application, of the printing rules displayed in the list form. The button B1 is pressed to accept application of the printing rule, and it is selected by default at the time of display of the initial determination result screen G1. The user may want to exempt from application of the printing rule. In this case, he or she presses the button B2 separately, hence the screen changes to show that the button B2 is being selected from the button B1 being selected. As a result, the exemption from application of the printing rule may be configured. In the example of FIG. 6, all of the three printing rules A, D and G shown in the list form allow the user to select the exemption from application, and buttons B1 and B2 are added to each of the printing rules A, D and G. These buttons B1 and B2 are not displayed with the printing rule which does not allow the user to select the exemption from application, and the user is not allowed to select the exemption from application.

In the lower part of the rule displaying region R1, an all yes button B3 and an all no button B4 are displayed. The all yes button B3 is pressed to collectively approve multiple printing rules which allow exemption from application by the user, and the all no button B4 is pressed to collectively set exemption from application. The user presses either of the all yes button B3 or the all no button B4, thereby collectively selecting the multiple printing rules which allow the user to select the exemption from application.

A layout image M3 of the printed output to be produced when the printing rule applying process of each printing rule A, D and G determined through the initial determination is performed is shown in the layout displaying region R2. When the user selects the approval or the exemption of the printing rule shown in the rule displaying region R1, the layout image M3 shown in the layout displaying region R2 is updated in real time in response to the user operation. As a result, the user is allowed to select the approval or the exemption from application of the printing rule determined through the initial determination while viewing the layout image of the printed output to be produced.

The user finally presses either the process continue button B5 or the process suspend button B6 in the lowest part of the initial determination result screen G1, thereby giving the instruction to continue or suspend the process on the print job JB1 at the stage of the initial determination. The initial determination result screen G1 is displayed relatively rapidly after the user gives the instruction to print, so it does not waste the time until he or she is allowed to check the result of the initial determination.

Referring back to FIG. 5, in response to displaying the initial determination result screen G1 in process P3, the information processing device 2 starts the main determination (process P4). To be more specific, the information processing device 2 analyzes in detail the job information DB in the print job JB1 generated by the print driver 28 and starts the main determination to accurately determine the printing rule to be applied to the print job JB1 based on both the header information DH and the job information DB. This main determination is performed on the information processing device 2 in parallel with the print job JB1 transmission process to the print server 3, for example.

The main determination is complete without receiving the user instruction to continue or suspend with the initial determination result screen G1 being displayed (process P5). The information processing device 2 then displays the result of the main determination on the display unit 21 (process P6). The screen of the display unit 21 switches to a main determination result screen from the above-described initial determination result screen G1.

Figure 7:
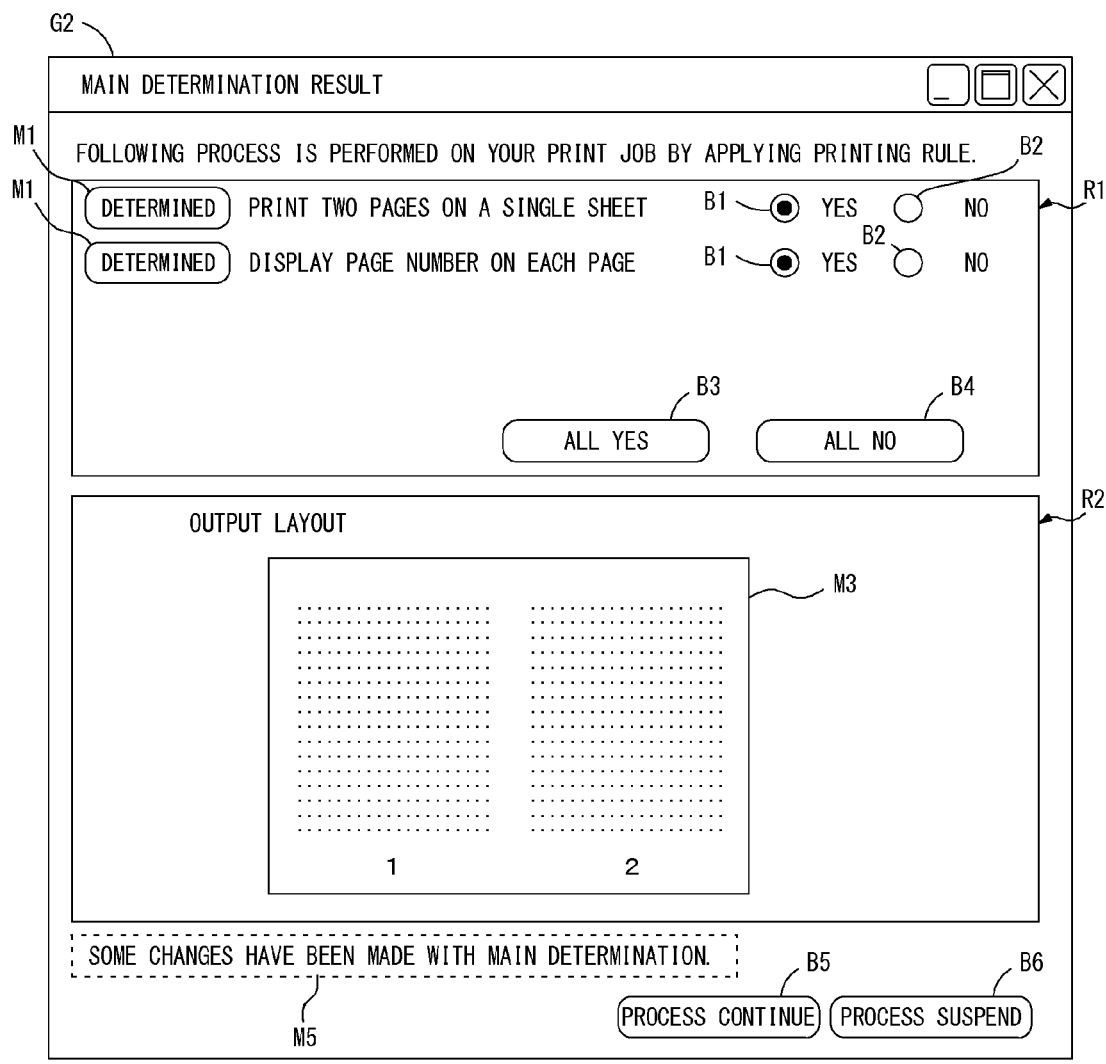
FIG. 7 is an example of a main determination result screen displayed on the information processing device.

FIG. 7 is an example of a main determination result screen G2 displayed on the information processing device 2. After the main determination by the main determination part 34 is complete, the main determination part 34 updates the initial determination result screen G1, and the main determination result screen G2 is displayed on the display unit 21. The main determination result screen G2 has the same screen structure as the above-described initial determination result screen G1, and it updates the result of the initial determination on the initial determination result screen G1 to the one of the main determination.

In the example of FIG. 7, the information M1 showing that the printing rule is finally determined is added to the printing rule A setting "printing two pages on a single sheet" in the rule displaying region R1, and the screen is updated to shown that the application of the printing rule A to the print job JB1 is finally determined. The printing rule G setting "printing in a specialized black and white machine" not finally determined on the initial determination result screen G1 is deleted on the main determination result screen G2. This shows that it is finally determined not to apply the printing rule G to the print job JB1 as a result of the main determination. Moreover, information M5 showing that the information is being updated as the result of the main determination is added to the lower part of the layout displaying region R2 on the main determination result screen G2. The main determination result screen G2 is displayed on the display unit 21 so that the user is allowed to know the result of the prior initial determination is changed in response to the main determination and to find that all the printing rules to be applied to the print job JB1 are finally determined.

The operation the user is allowed to make as the main determination result screen G2 being displayed is the same as that the user is allowed to make as the initial determination result screen G1 being displayed. The user may exempt from application of the printing rule which is allowed in advance of the printing rules to be applied to print job JB1. The user presses the continue button B5, thereby giving the instruction to continue the process on the print job JB1, and presses the suspend button B6, thereby giving the instruction to suspend the process. Moreover, the user is allowed to specify the exemption from application of a part or all of the printing rules applied to the print job JB1 and give the instruction to continue.

Referring back to FIG. 5, after detecting the user instruction while displaying the main determination result screen G2 (process P7), the information processing device 2 performs the process corresponding to the instruction. When the user instruction to continue is given, for instance, the information processing device 2 sends a continue instruction D3 to the print server 3. The continue instruction D3 contains information about the printing rule specified by the user to apply to the print job JB1. In response to receiving the continue instruction D3, the print server 3 performs the process to apply the specified printing rule based on the information about the printing rule contained in the continue instruction D3, thereby converting the print job JB1 to the print job JB2 (process P8). If, for example, the print settings of the print job JB1 already match the printing rule before applying the printing rule to the print job JB1, it is not necessary to perform a new the process to apply the printing rule. The print server 3 sends the print job JB2 matching the printing rule to the image forming device 5. After receiving the print job JB2, the image forming device 5 produces the printed output (process P9). The image forming device 5 produces the printed output which matches the printing rule and in a way the user intends. The printed output to be produced by the image forming device 5 is the same as the one checked by the user in advance, hence the printed output does not go to waste.

When the user instruction to suspend is detected in process P7, the information processing device 2 performs the process to suspend the later process on the print job JB1. To be more specific, the information processing device 2 sends the instruction to suspend to the print server 3 to suspend the later process on the print job JB1 and delete the print job JB1.

Figure 8:
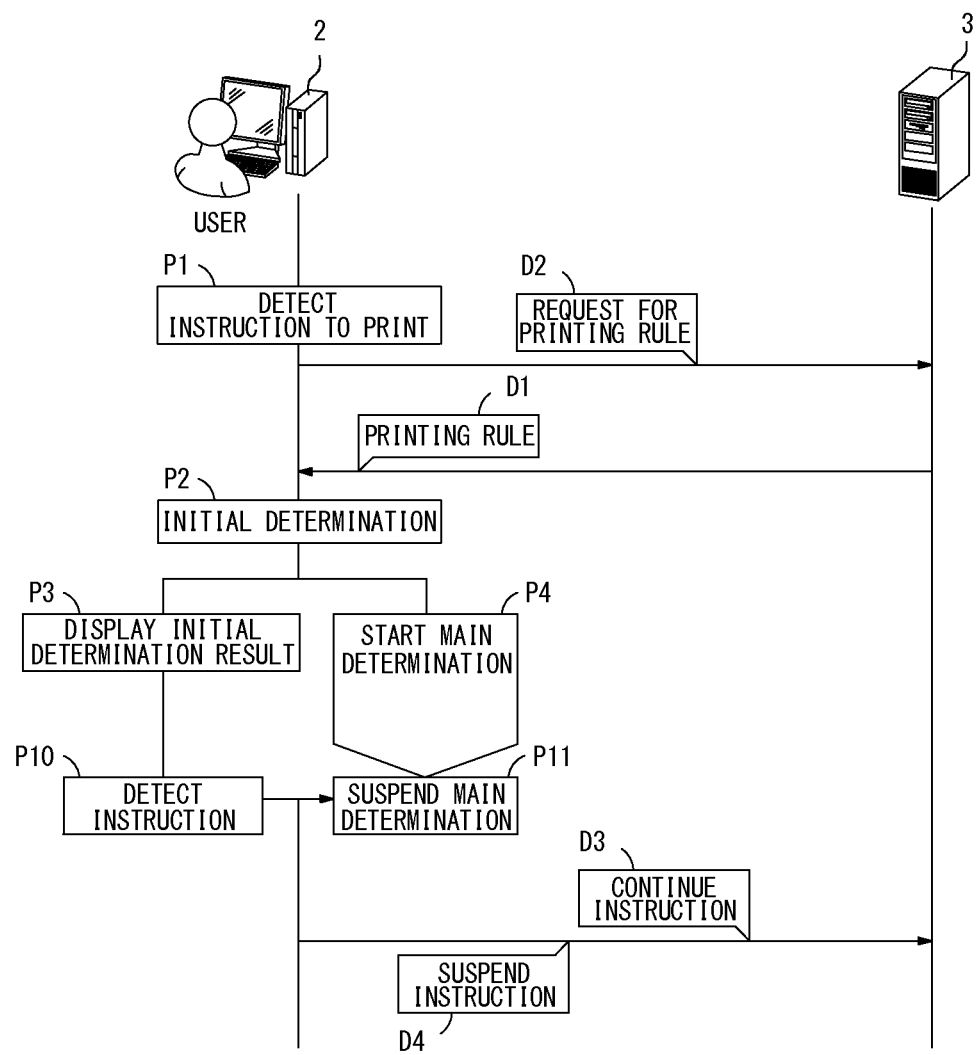
FIG. 8 is the exemplary sequence diagram of the process performed when a user gives an instruction to continue or suspend in response to the result of the initial determination as the main determination is still going on in the information processing device.

FIG. 8 is the exemplary sequence diagram of the process performed when the user gives the instruction to continue or suspend in response to the result of the initial determination as the main determination is still going on. In FIG. 8, after detecting the user instruction to print, the information processing device 2 displays the result of the initial determination and starts the main determination in parallel with displaying in processes P1 to P4. The processes P1 to P4 are the same as those in FIG. 5.

After detecting the user instruction while displaying the initial determination result screen G1 (process P10), the information processing device 2 suspends the uncompleted main determination (process P11). The information processing device 2 then sends the continue instruction D3 or a suspend instruction D4 to the print server 3 in response to the user instruction. For sending the continue instruction D3, for example, the continue instruction D3 contains the information about the printing rule specified by the user to apply to the print job JB1 as the initial determination result screen G1 is displayed which is the same as the above-described process. In response to receiving the continue instruction D3 or the suspend instruction D4, the print server 3 performs the process on the print job JB1 in response to the instruction. To be more specific, for receiving the continue instruction D3, the print server 3 applies the printing rule specified by the continue instruction D3 to the print job JB1 and generates the print job JB2 matching the printing rule. For receiving the suspend instruction D4, the print server 3 suspends the later process on the print job JB1 and deletes the print job JB1.

As described above, according to the first preferred embodiment, at the time of receiving the user instruction to print, the information processing device 2 acquires the printing rule D1 corresponding to the user from the print server 3 and makes the initial determination to determine the printing rule applied to the print job JB1 generated in response to the instruction to print. The information processing device 2 then displays the result of the initial determination relatively rapidly. The user, therefore, is allowed to check the result of the initial determination relatively rapidly after giving the instruction to print and give the instruction to continue or suspend the process on the print job JB1 based on the result of the initial determination. There will be no waiting time for the user, resulting in enhanced working efficiency.

As described above, after receiving the request for printing rule D2 from the information processing device 2, the print server 3 extracts the printing rule D1 in the rule information 6 applied to the user of the information processing device 2 and sends the extracted printing rule to the information processing device 2. The print server 3 may extract all printing rules in the rule information 6 applied to the user of the information processing device 2 and sends the extracted printing rules to the information processing device 2.

The print server 3 is capable of distinguishing the printing rule which is not applied to the print job JB1 generated on the information processing device 2 of all the printing rules applied to the user of the information processing device 2 by searching through the rule information 6 by the receipt time of the request for printing rule D2 or the address of the sender of the request for printing rule D2 (for instance, an IP address of the information processing device 2). It is assumed, for example, all the printing rules A to G registered with the rule information 6 of FIG. 2 are applied to the user of the information processing device 2, and the print server 3 receives the request for printing rule D2 from the information processing device 2 after 1:00 PM. In this case, it is obvious that the printing rule B is not applied to the print job JB1 generated after 1:00 PM. When, for example, the address of the sender of the request for printing rule D2 received by the print server 3 from the information processing device 2 represents the address sent from the fourth floor, it is obvious that the printing rule C is not applied to the print job JB1 generated on the information processing device 2. For sending the printing rule D1 applied to the user of the information processing device 2 in response to the request for printing rule D2 from the information processing device 2, the rule transmitting part 14 of the print server 3 may only extract the part of all the printing rules applied to the user of the information processing device 2 by excluding the printing rule not to be applied and send to the information processing device 2.

Figure 9:
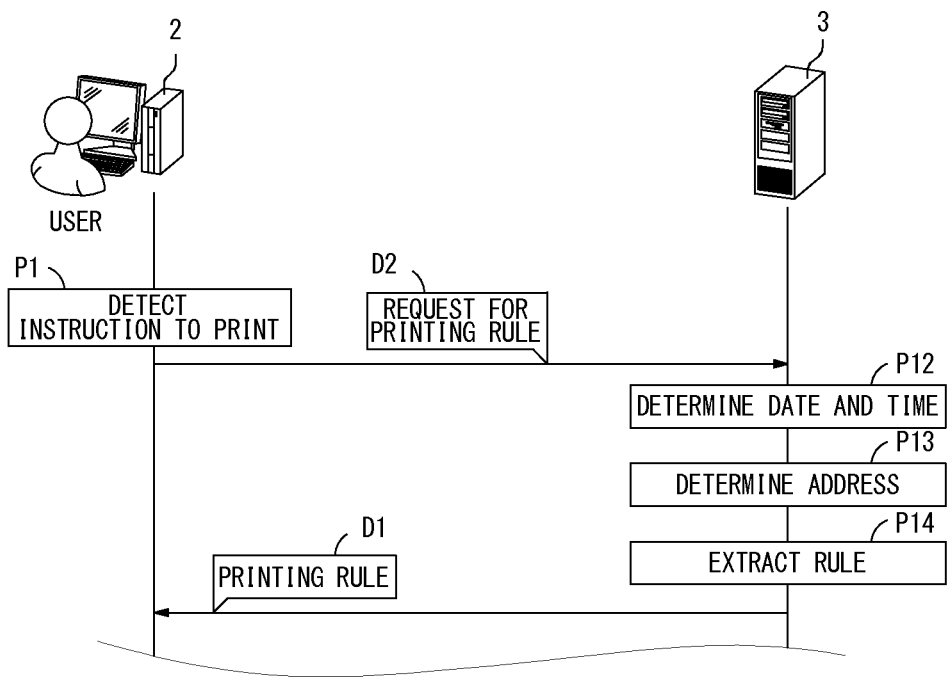
FIG. 9 is the exemplary sequence diagram of the process performed when a print server only sends a part of the printing rules excluding the printing rule not to be applied to the information processing device.

FIG. 9 is the exemplary sequence diagram of the process performed when print server 3 only sends the part of the printing rules excluding the printing rule not to be applied to the information processing device 2. As described above, after the user instruction to print is detected (process P1), the information processing device 2 sends the request for printing rule D2 to the print server 3. In response to receiving the request for printing rule D2, the print server 3 determines the current date and time at first (process P12), then determining the address of the sender (process P13). The print server 3 extracts the printing rule in the rule information 6 applied to the user of the information processing device 2 (process P14). The print server 3 determines the printing rule applying job 6c with the current date and time and the address of the sender, thereby excluding the printing rule not to be applied from the ones to be sent to the information processing device 2. The print server 3 then sends the part of the printing rules D1 excluding the printing rule not to be applied to the information processing device 2. As described above, the print server 3 excludes the printing rule obviously not to be applied from the printing rules applied to the user of the information processing device 2, then sending the rest of the printing rules to the information processing device 2. Thus, the burden on the network is reduced, and the process load for the initial or the main determination on the information processing device 2 is reduced, resulting in enhanced process efficiency.

Figure 10:
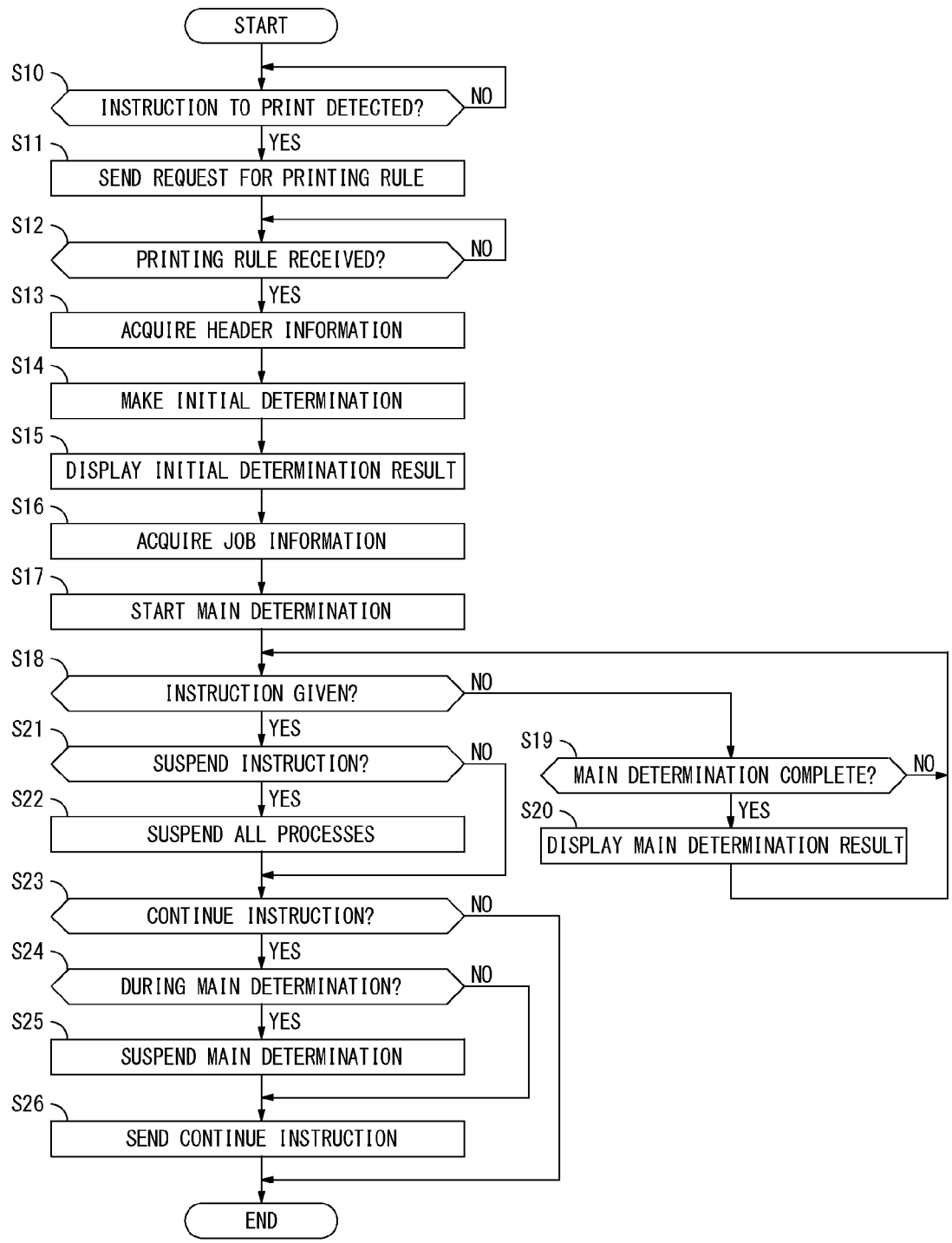
FIG. 10 is a flow diagram explaining an exemplary sequential procedure of the process performed by a rule managing part of the information processing device.

The detailed operation performed by the rule managing part 30 of the information processing device 2 is described next. FIG. 10 is a flow diagram explaining an exemplary sequential procedure of the process performed by the rule managing part 30 of the information processing device 2. The rule managing part 30 resides in the information processing device 2 and waits for detection of the user instruction to print (step S10). After the user instruction to print is detected (when a result of step S10 is YES), the rule managing part 30 sends the request for printing rule D2 to the print server 3. The information processing device 2 starts generation of the print job JB1 by the print driver 28 in parallel with the process performed by the rule managing part 30. In response to receiving the printing rule D1 from the print server 3 (when a result of step S12 is YES), the rule managing part 30 acquires the header information DH in the print job JB1 from the print driver 28 (step S13), and proceeds with the initial determination to determine the printing rule applied to the print job JB1 (step S14). After completing the initial determination, the rule managing part 30 displays the initial determination result screen G1 on the display unit 21 (step S15). As a result, the user is allowed to check the result of the initial determination.

After displaying the result of the initial determination, the rule managing part 30 acquires the job information DB in the print job JB1 from the print driver 28 (step S16), and starts the main determination to determine the printing rule applied to the print job JB1 (step S17). A certain period of time is required to complete the main determination.

After starting the main determination, the rule managing part 30 determines whether or not the user instruction is given while the initial determination result screen G1 is displayed (step S18). When the user instruction is not given (when a result of step S18 is NO), the rule managing part 30 determines whether or not the main determination is complete (step S19). If the main determination is still going on, the rule managing part 30 returns to the process in step S18. If the main determination is complete, the rule managing part 30 updates the screen of the display unit 21 to the main determination result screen G2 from the initial determination result screen G1 (step S20). The result of the main determination by the main determination part 34 may differ from the one of the initial determination by the initial determination part 33. In this case, the rule managing part 30 updates the information on the initial determination result screen G1 which is different from the main determination, thereby creating the main determination result screen G2 and displaying the created screen on the display unit 21. The rule managing part 30 then returns to the process in step S18.

When the user instruction given while displaying the initial determination result screen G1 or the main determination result screen G2 is detected in step S18 (when a result of step S18 is YES), the rule managing part 30 determines whether or not the user instruction is to suspend the process (step S21). The user instruction may be the one to suspend the process. In this case, the rule managing part 30 suspends all the ongoing processes on the print job JB1 (step S22). When the print job JB1 is being generated by the print driver 28, the rule managing part 30 suspends the generation. Also, the rule managing part 30 suspends the process to send the print job JB1 to the print server 3. The rule managing part 30 then sends the suspend instruction D4 to instruct suspension and deletion of the print job JB1 received until then to the print server 3. If the print driver 28 has not sent the print job JB1 to the print server 3, it is not necessary for the rule managing part 30 to send the suspend instruction D4 to the print server 3. When the user instruction is not the one to suspend, the process in step S22 is skipped.

The rule managing part 30 determines whether or not the user instruction is to continue the process (step S23). When the user instruction is to continue, the rule managing part 30 further determines whether or not it is during the main determination (step S24). When it is during the main determination (when a result of step S24 is YES), the rule managing part 30 suspends the main determination (step S25). If it is not during the main determination (when a result of step S24 is NO), the rule managing part 30 skips the process in step S25. The rule managing part 30 then sends the continue instruction D3 to the print server 3 (step S26). If the user instruction is not to continue (when a result of step S23 is NO), the rule managing part 30 skips the process in steps S24 to S26 and completes the whole process.

As described above, on the print system 1 of the first preferred embodiment, the printing rule registered in advance with the print server 3 is applied to the print job JB1 sent from the information processing device 2 and the print job JB1 is converted to the print job JB2 so that the printed output is produced in a way defined by the printing rule. The information processing device 2 that sends the print job JB1 to the print server 3 includes the rule acquiring part 31 which acquires the printing rule D1 sent from the print server 3. The print job JB1 contains the header information DH and the job information DB is generated in response to the user instruction to print. The information processing device 2 then makes the initial determination to determine whether or not the printing rule D1 acquired by the rule acquiring part 31 is applied to the print job JB1 based on the header information DH, and displays the result of the initial determination on the display unit 21. After displaying the result of the initial determination on the display unit 21, the user instruction to continue may be given. In this case, the information processing device 2 makes the later process on the print job JB1 continue in response to the user instruction to continue. When the user instruction to suspend is given, the information processing device 2 suspends the process on the print job JB1 in response to the user instruction to suspend. Thus, the print system 1 of the first preferred embodiment is capable of rapidly displaying the user the result of the initial determination based on the header information DH in the print job JB1 after the user instruction to print is given. As a result, the user is allowed to check the result of applying the printing rule immediately, and he or she does not need to waste a time, resulting in a good operability in printing.

The information processing device 2 includes the main determination part 34. After the initial determination by the initial determination part 33, the main determination part 34 makes the main determination to determine whether or not the printing rule D1 acquired by the rule acquiring part 31 is applied to the print job JB1 based on both the header information DH and the job information DB in the print job JB1. It sometimes is not allowed to accurately determine the printing rule to be applied to the print job JB1 through the initial determination. Even in this case, the main determination by the main determination part 34 allows accurate determination of the printing rule.

The user instruction to continue or suspend may be given during the main determination by the main determination part 34. In this case, the information processing device 2 suspends the main determination by the main determination part 34. For suspending the main determination by the main determination part 34 in response to the user instruction to continue, the information processing device 2 specifies the printing rule to apply to the print job JB1 to the print server 3 based on the instruction to continue and the result of the initial determination by the initial determination part 33. As a result, the user is allowed to input the instruction to continue or suspend without waiting for the result of the main determination which takes relatively long.

According to the first preferred embodiment, every time the information processing device 2 detects the user instruction to print, it sends the request for printing rule D2 to the print server 3. The printing rule D1 to be acquired this time may be the same as the printing rule D1 acquired previously. In such a case, the same printing rule D1 is not necessary to be acquired again from the print server 3. The rule acquiring part 31 of the information processing device 2 is configured to acquire only the information relating to the printing rule updated on the print server 3 between the previous and current acquisition and update the previously acquired printing rule D1 based on the information. As described above, it is not necessary to acquire the same printing rule D1 again from the print server 3, resulting in enhanced process efficiency.

As described above, for applying the printing rule and producing the printed output, the result of applying the printing rule can be displayed to the user who has given the print job promptly, and the user is not necessary to waste their time, resulting in enhanced user friendliness and operability in printing for the user.

(Second Preferred Embodiment)

The second preferred embodiment is described next. In the above-described first preferred embodiment, after the user instruction to print is detected, the information processing device 2 acquires the printing rule D1 from the print server 3 and makes the initial and main determinations to determine the printing rule applied to the print job JB1. The volume of data of the print job JB1 generated by the print driver 28 may be smaller than the volume of data of the printing rule D1 acquired from the print server 3. In this case, rather than sending the printing rule D1 to the print server 3 and performing process such as the initial determination, it may improve the process efficiency better for the information processing device 2 to send the print job JB1 to the print server 3 and acquire the result of the initial determination, for instance, from the print server 3. In the second preferred embodiment, the information processing device 2 acquires the result of the initial determination, for instance, from the print server 3 and displays the acquired result in the aforementioned case in exceptional basis. The hardware configuration of the printing system 1 of the second preferred embodiment is the same as that of the first preferred embodiment.

The rule acquiring part 31 of the information processing device 2 of the second preferred embodiment estimates a time required for acquiring the latest printing rule D1 (hereafter, rule acquiring time) based on the volume of the data of the printing rule D1 in the storage unit 23 acquired in the past from the print server 3. The rule acquiring part 31 further estimates a time required for sending the print job JB1 to the print server 3 (hereafter, job sending time) based on the volume of the data of the print job JB1 generated by the print driver 28. The rule acquiring part 31 then compares the rule acquiring time and the job sending time with each other. When the job sending time is shorter than the rule acquiring time, the rule acquiring part 31 exceptionally requests for the result of the initial determination to the print server 3 instead of sending the request for the printing rule. When the job sending time is longer than the rule acquiring time, the rule acquiring part 31 performs the process the same as that described in the first preferred embodiment.

Figure 11:
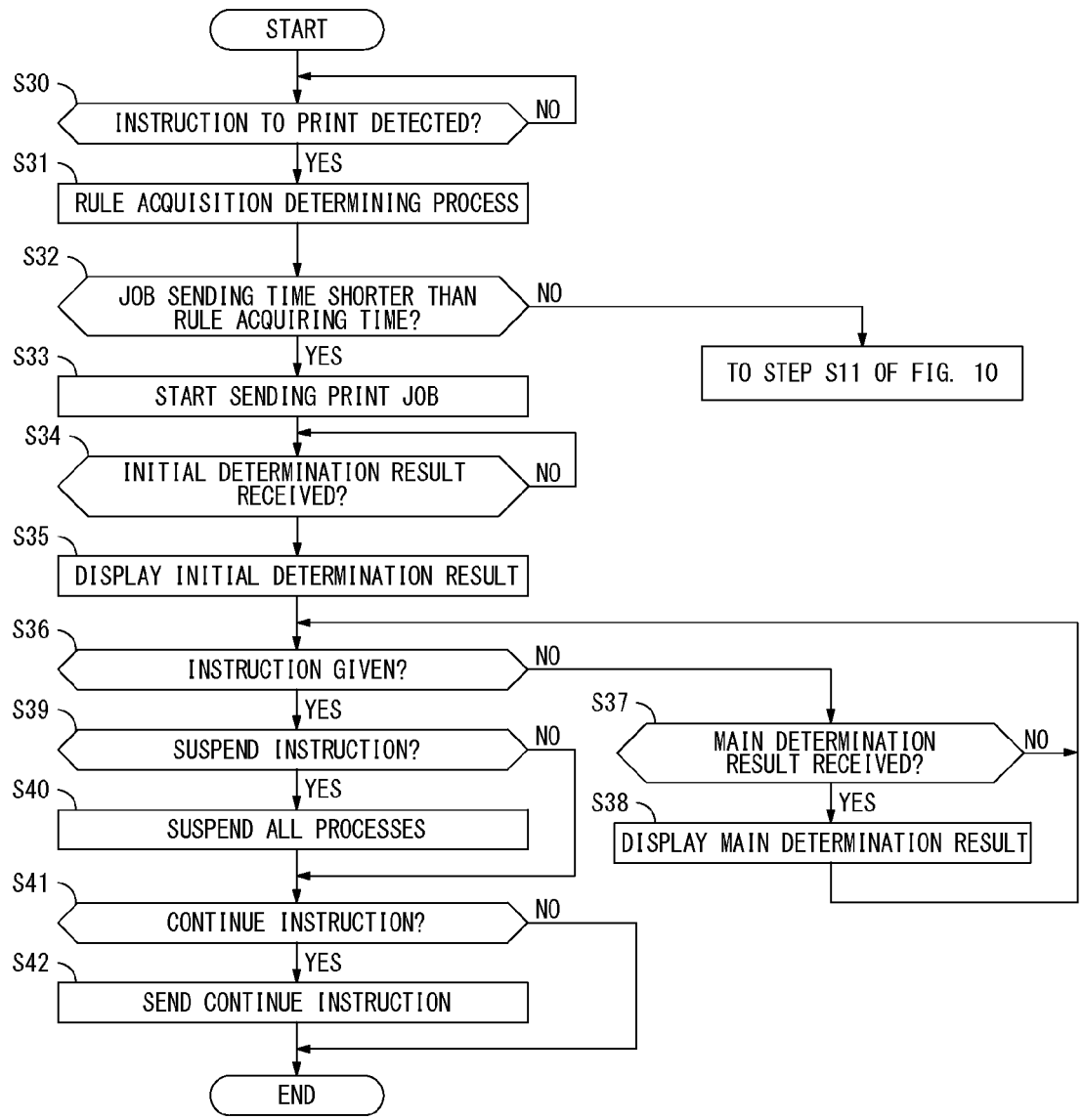
FIG. 11 is a flow diagram explaining an exemplary sequential procedure of the process performed by the rule managing part of the information processing device of a second preferred embodiment.

FIG. 11 is a flow diagram explaining an exemplary sequential procedure of the process performed by the rule managing part 30 of the information processing device 2 of the second preferred embodiment. After the user instruction to print is detected (when a result of step S30 is YES), the rule managing part 30 performs a rule acquisition determining process (step S31). In the rule acquisition determining process, the rule managing part 30 compares the rule acquiring time and the job sending time with each other as described above. The rule managing part 30 determines whether or not the job sending time is shorter than the rule acquiring time (step S32). When the job sending time is longer than the rule acquiring time (when a result of step S32 is NO), the rule managing part 30 performs the process in step S11 of FIG. 10 described in the first preferred embodiment. When the job sending time is shorter than the rule acquiring time (when a result of step S32 is YES), the rule managing part 30 gives the instruction to the print driver 28 to send the print job JB1 and starts the process to send the print job JB1 to the print server 3 (step S33). The rule managing part 30 waits until receiving an initial determination result D5 from the print server 3 (step S34). After receiving the initial determination result D5, the rule managing part 30 displays the initial determination result screen G1 on the display unit 21 (step S35).

The rule managing part 30 determines whether or not the user instruction is given while the initial determination result screen G1 is displayed (step S36). With no user instruction given (when a result of step S36 is NO), the rule managing part 30 determines whether or not a main determination result D6 is received from the print server 3 (step S37). If the main determination result D6 is not received, the rule managing part 30 returns to the process in step S36. If the main determination result D6 is received, the rule acquiring part 31 updates the screen of the display unit 21 to the main determination result screen G2 from the initial determination result screen G1 (step S38). The main determination result D6 may differ from the initial determination result D5. In this case, the rule managing part 30 updates the information of the initial determination result screen G1 which is different from the main determination, thereby creating the main determination result screen G2 and displaying the created screen on the display unit 21. The rule managing part 30 returns to the process in step S36.

When the user instruction is detected while the initial determination result screen G1 or the main determination result screen G2 is being displayed in step S36 (when a result of step S36 is YES), the rule managing part 30 determines if the detected user instruction is to suspend (step S39). When the user instruction is to suspend, the rule managing part 30 sends the suspend instruction D4 to the print server 3. When the user instruction is not the one to suspend, the process in step S40 is skipped.

The rule managing part 30 determines whether or not the user instruction is to continue the process (step S41). When the user instruction is to continue, the rule managing part 30 sends the continue instruction D3 to the print server 3 (step S42). When the user instruction is not the one to continue, the process in step S42 is skipped and the whole process is complete.

As described above, in the second preferred embodiment, once the rule acquiring part 31 of the information processing device 2 becomes operative, it compares the job sending time required for sending the printing job JB1 generated by the print driver 28 to the print server 3 and the rule acquiring time required for acquiring the printing rule D1 from the print server 3 with each other. When the job sending time is shorter than the rule acquiring time, the rule acquiring part 31 is configured not to acquire the printing rule from the print server 3. When the printing rule is not acquired by the rule acquiring part 31, the initial determination part 33 of the information processing device 2 acquires the result of the initial determination from the print server 3 and displays the initial determination result screen G1 on the display unit 21. With the information processing device 2 having the above-described configuration, the result of applying the printing rule may be delivered to the user relatively quickly and the process on the print job JB1 may be conducted efficiently. Everything is the same as the first preferred embodiment except for the above-described point.

(Third Preferred Embodiment)

The third preferred embodiment is described next. In the above-described first and second preferred embodiments, after the user instruction to print is detected, the information processing device 2 acquires the printing rule D1 from the print server 3. The information processing device 2 acquires the printing rule D1 from the print server 3 not only after the user instruction to print is detected. In the third preferred embodiment, the information processing device 2 acquires the printing rule D1 from the print server 3 at the different timing from the above-described first and second preferred embodiments.

Figure 12:
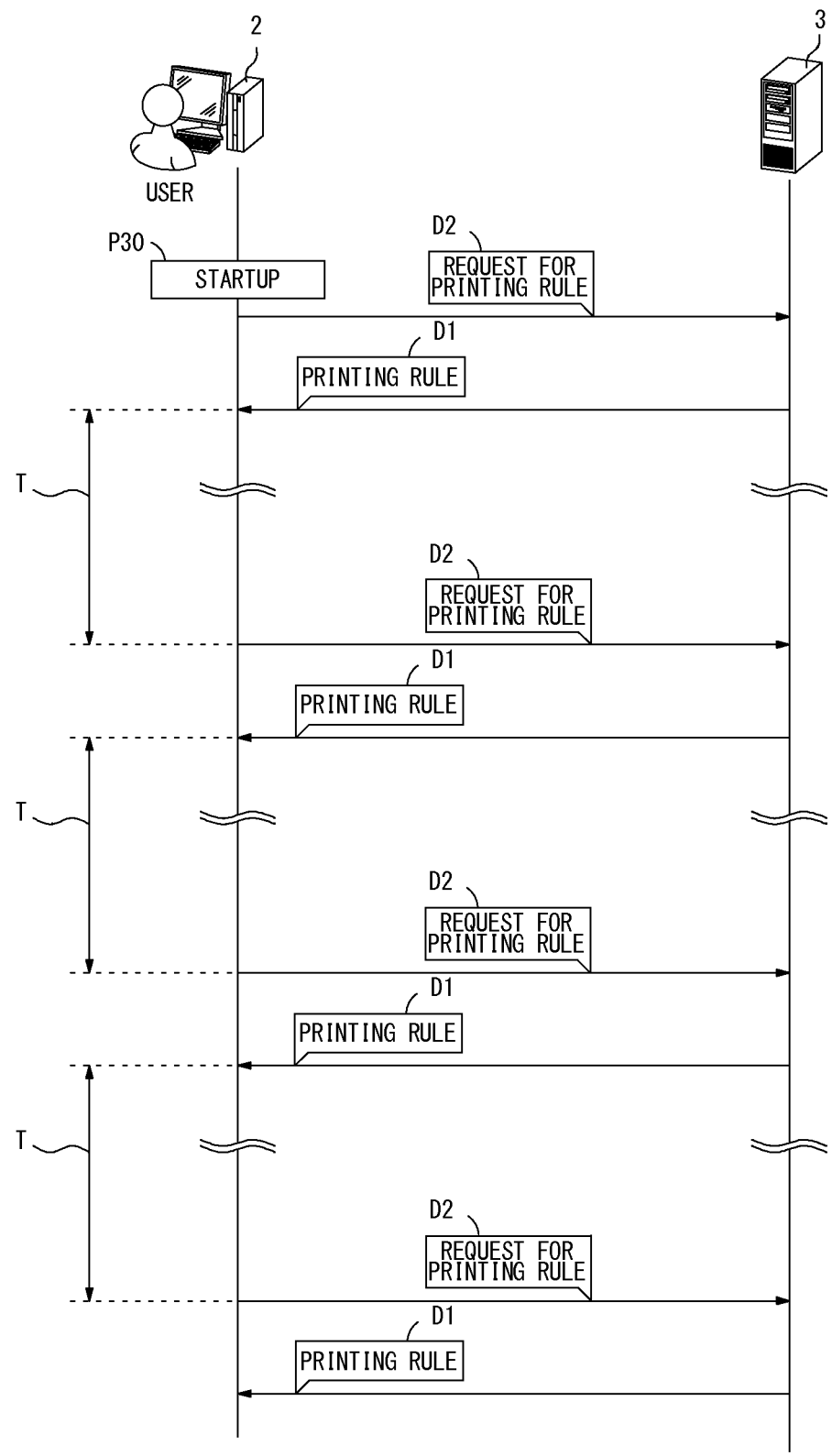

FIG. 12 is the exemplary sequence diagram of the process performed when the information processing device 2 acquires the printing rule D1 from the print server 3 in response to being powered on and after then it acquires the printing rule D1 from the print server 3 on a regular basis. As shown in FIG. 12, after the information processing device 2 starts up in response to being powered on (process P30), it runs the rule management program 26 to put the rule managing part 30 into operation. The rule managing part 30 sends the request for printing rule D2 to the print server 3 at the startup. After receiving the request for printing rule D2, the print server 3 extracts the printing rule D1 applied to the user of the information processing device 2 in the rule information 6 and sends the extracted printing rule D1 to the information processing device 2. The information processing device 2 stores the received printing rule D1 in the storage unit 23.

As shown in FIG. 12, after then the rule acquiring part 31 of the rule managing part 30 becomes operative every predetermined period of time T to repeatedly send the request for printing rule D2 to the print server 3 on a regular basis. Every time receiving the request for printing rule D2, the print server 3 extracts the printing rule D1 applied to the user of the information processing device 2 in the rule information 6 and sends the extracted printing rule D1 to the information processing device 2.

The rule managing part 30, however, is not required to acquire again the same rule as the printing rule D1 already stored in the storage unit 23. For acquiring the printing rule from the print server 3 every predetermined period of time T, the rule acquiring part 31 updates the printing rule D1 in the storage unit 23 by only acquiring the information relating to the updated printing rule if the printing rule is updated in the print server 3 between the previous and current acquisition. More specifically, for sending the request for printing rule D2 to the print server 3 every predetermined period of time T, the rule acquiring part 31 sends the request for printing rule D2 containing information such as information as to time of storing the printing rule D1 in the storage unit 23 and information as to time of updating the printing rule D1 in the storage unit 23. Some printing rules may be updated after the time of storing the printing rule D1 or the time of updating the printing rule D1 based on the time information in the request for printing rule D2. In such a case, the print server 3 only sends the information as to the updated printing rule to the information processing device 2. Thus, the information processing device 2 is not required to acquire the overlapping information from the print server 3 every predetermined period of time T.

Figure 13:
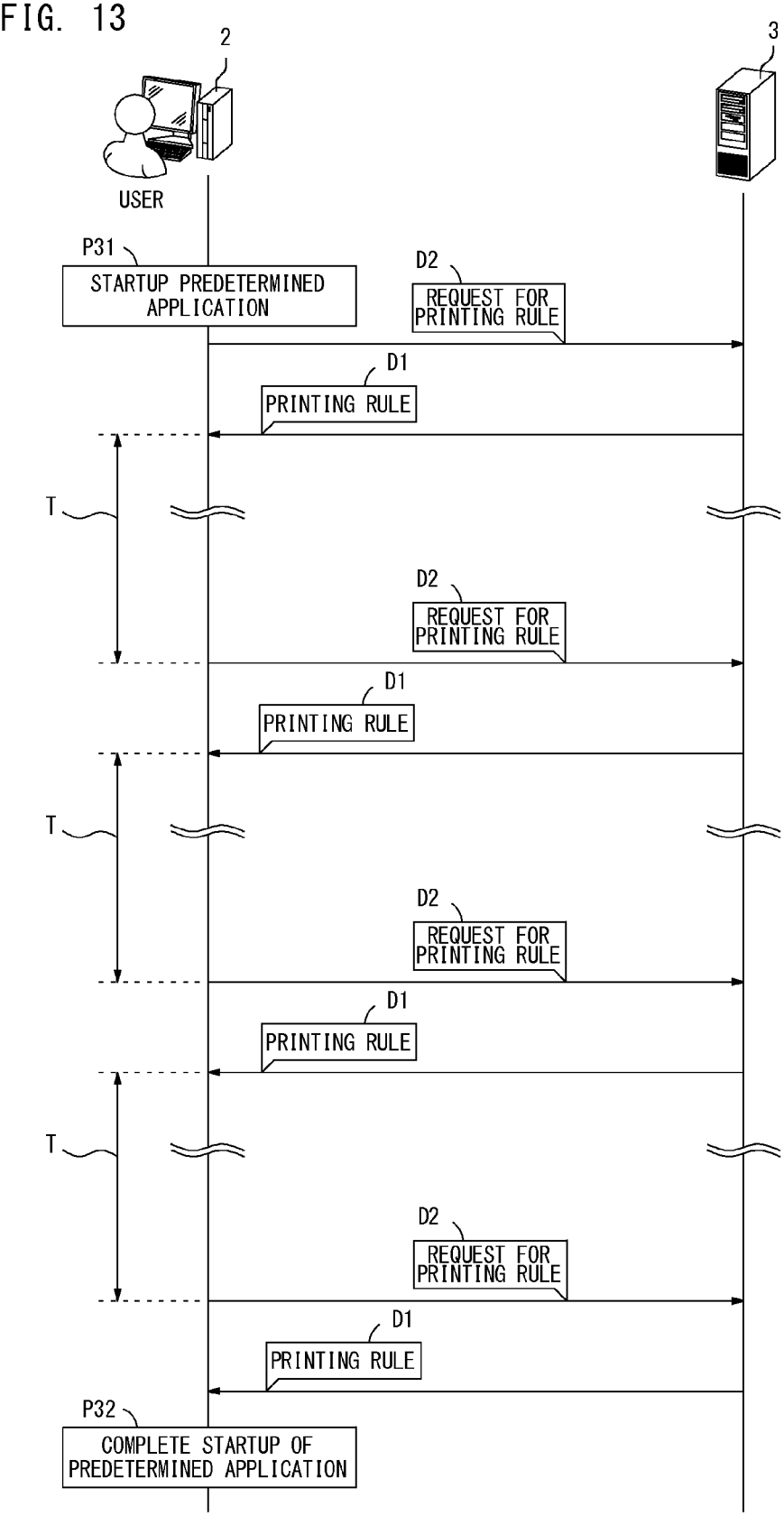
FIG. 13 is the exemplary sequence diagram of the process performed when a predetermined application is started up on the information processing device and after then the rule managing part acquires the printing rule from the print server.

The rule acquiring part 31 of the rule managing part 30 becomes operative to acquire the printing rule D1 from the print server 3 at the different timing from the above-described example is described next. FIG. 13 is the exemplary sequence diagram of the process performed when a predetermined application is started up on the information processing device 2, hence the rule managing part 30 acquires the printing rule D1 from the print server 3, and after then it acquires the printing rule D1 from the print server 3 on a regular basis. As shown in FIG. 13, after the predetermined application is started up on the information processing device 2 (process P31), the rule managing part 30 sends the request for printing rule D2 to the print server 3. The predetermined application is the one being run in response to startup of the aforementioned application program 24. The application may be the document application, the presentation application or the email application, for example, to which the user may give the instruction to print. More specifically, in the example of FIG. 13, the rule managing part 30 does not acquire the printing rule D1 from the print server 3 when the information processing device 2 is simply being started up. The rule managing part 30 starts operation to acquire the printing rule D1 from the print server 3 when the application to which the user may give the instruction to print is started up.

In response to receiving the request for printing rule D2 from the information processing device 2, the print server 3 extracts the printing rule D1 in the rule information 6 applied to the user of the information processing device 2 and sends the extracted printing rule D1 to the information processing device 2. The information processing device 2 stores the printing rule D1 in the storage unit 23. After then, the rule acquiring part 31 of the rule managing part 30 becomes operative every predetermined period of time T to send the request for printing rule D2 to the print server 3 repeatedly on a regular basis as shown in FIG. 13. Every time receiving the request for printing rule D2, the print server 3 extracts the printing rule D1 applied to the user of the information processing device 2 in the rule information 6 and sends the extracted printing rule D1 to the information processing device 2. As described above, in also this case, it is not necessary for the rule managing part 30 to acquire the same rule as the printing rule D1 stored in the storage unit 23 again. Thus, the rule managing part 30 acquires only the information relating to the updated printing rule and updates the printing rule D1 in the storage unit 23 if the printing rule is updated on the print server 3 between the previous and current acquisition.

As shown in FIGS. 12 and 13, the information processing device 2 acquires in advance the printing rule D1 from the print server 3 before the user instruction to print is detected so that it is allowed to make the initial or main determination by reading the printing rule D1 already stored at the point of detection in the storage unit 23 in response to detecting the user instruction to print. According to the third preferred embodiment, when the user instruction to print is detected, it is not necessary for the information processing device 2 to acquire the printing rule D1 from the print server 3. As a result, the initial determination result screen G1 may be displayed on the information processing device 2 quicker than in the first and second preferred embodiments.

Everything is the same as the first preferred embodiment other than the above-described point.

(Fourth Preferred Embodiment)

The fourth preferred embodiment is described next. In the above-described first, second and third preferred embodiments, the information processing device 2 sends the request for printing rule D2 to the print server 3, thereby acquiring the printing rule D1 from the print server 3. In the fourth preferred embodiment, the information processing device 2 does not send the request for printing rule D2 to the print server 3, and the print server 3 voluntarily sends the printing rule D1 to the information processing device 2.

Figure 14:
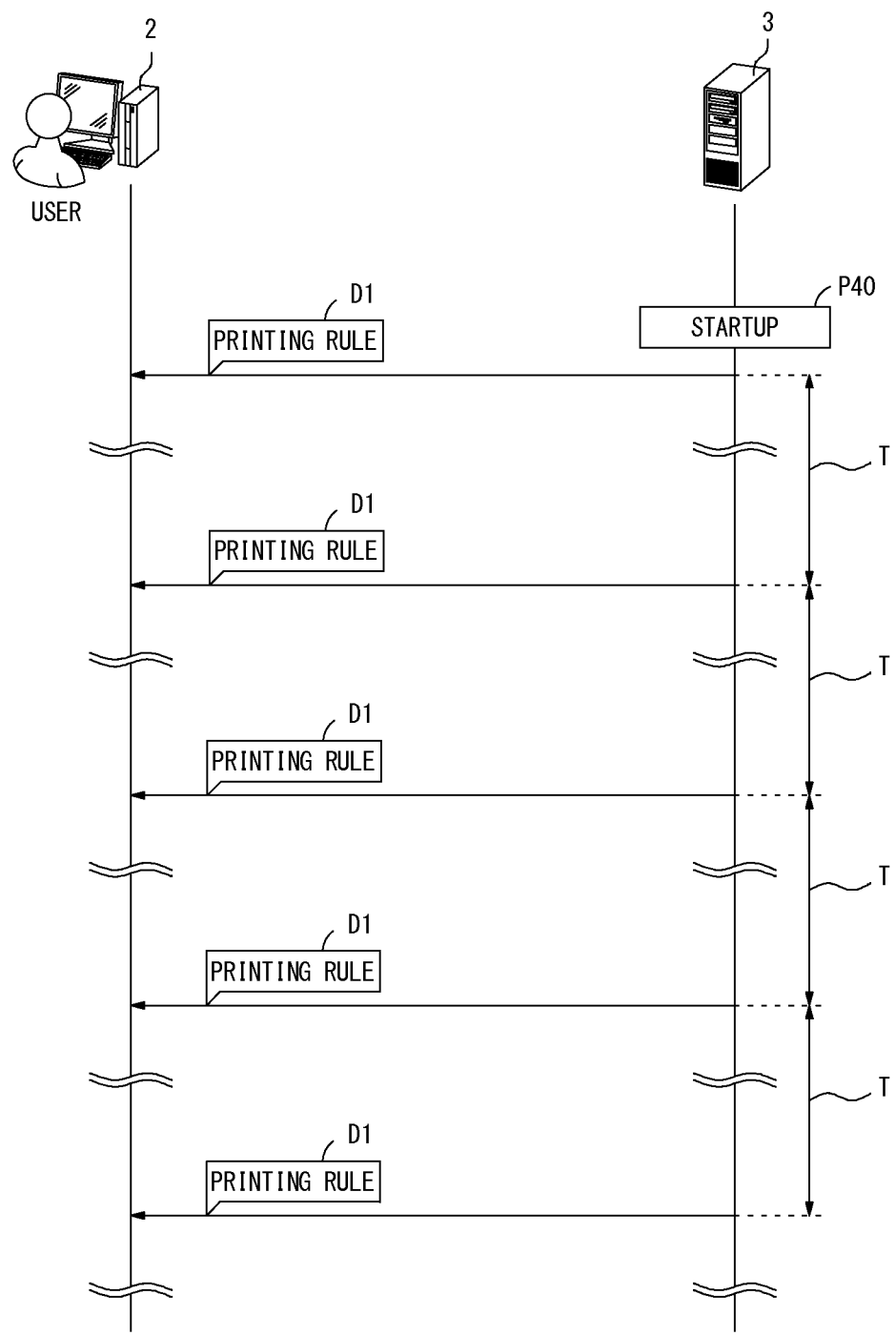
FIG. 14 is the exemplary sequence diagram of the process performed for sending the printing rule from the print server to the information processing device at startup of the print server.

FIG. 14 is the exemplary sequence diagram of the process performed for sending the printing rule D1 from the print server 3 to the information processing device 2 at startup of the print server 3. As shown in FIG. 14, the print server 3 is started up in response to being powered on (process P40), the rule transmitting part 14 of the print server 3 becomes operative. The rule transmitting part 14 extracts the printing rule D1 applied to the user of the information processing device 2 in the rule information 6, and sends the extracted printing rule D1 to the information processing device 2. Information including the information processing device 2 to which the printing rule D1 is sent and the corresponding user who is using the information processing device 2 is registered in advance with the print server 3. The print server 3 extracts the printing rule D1 based on the registered information and sends the extracted printing rule D1 to the information processing device 2. After receiving the printing rule D1 from the print server 3, the information processing device 2 stores the printing rule D1 in the storage unit 23. The print server 3 may send the printing rule D1 to the information processing device 2 at startup. Even in this case, it does not mean the information processing device 2 always started up to be ready for receiving the printing rule D1. Thus, after sending the printing rule D1 at startup, the print server 3 carries out the process to send the printing rule D1 repeatedly on a regular basis by putting the rule transmitting part 14 into operation every predetermined period of time T. As a result, the information processing device 2 is allowed to store in advance the printing rule D1 received from the print server 3 after startup in the storage unit 23.

Figure 15:
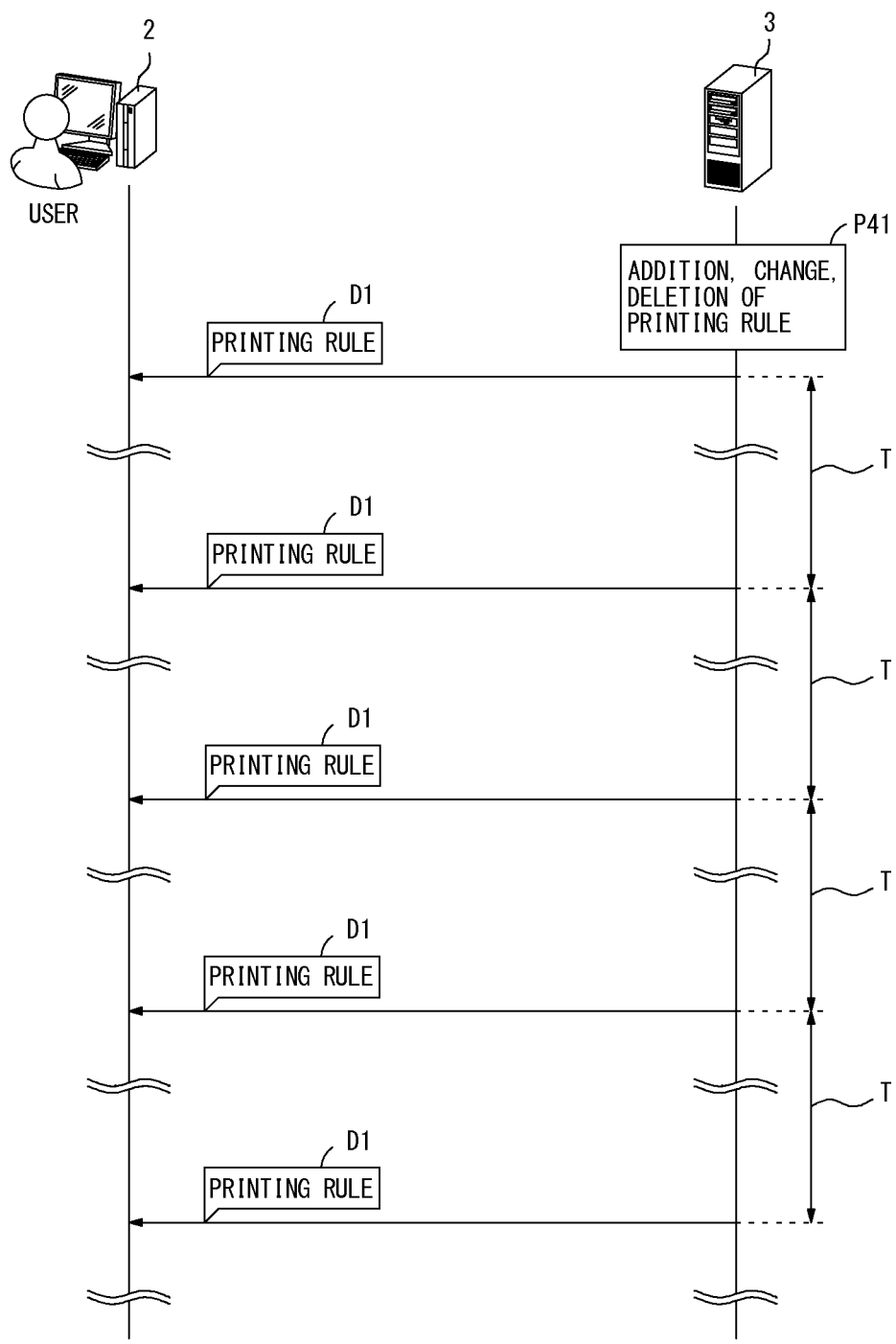
FIG. 15 is the exemplary sequence diagram of the process performed for sending the printing rule from the print server to the information processing device at addition, change or deletion of the printing rule in the rule information on the print server.

FIG. 15 is the exemplary sequence diagram of the process performed for sending the printing rule D1 from the print server 3 to the information processing device 2 at addition, change or deletion of the printing rule in the rule information 6 on the print server 3. As shown in FIG. 15, when any printing rule in the rule information 6 on the print server 3 is added, changed or deleted (process P41), the rule transmitting part 14 of the print server 3 becomes operative. The rule transmitting part 14 extracts the printing rule applied to the user of the information processing device 2 in the rule information 6, and sends the extracted printing rule D1 to the information processing device 2. After then, the print server 3 puts the rule transmitting part 14 into operation every predetermined period of time T to perform the process to send the printing rule D1 repeatedly on a regular basis. As a result, the information processing device 2 is allowed to store in advance the printing rule D1 received from the print server 3 after startup in the storage unit 23.

As shown in FIGS. 14 and 15, the information processing device 2 is allowed to store in advance the printing rule D1 by receiving which from the print server 3. Thus, the information processing device 2 is allowed read the printing rule D1 stored in the storage unit 23 at the point to make the initial or main determination in response to detecting the user instruction to print. Also in the fourth preferred embodiment, when the user instruction to print is detected, it is not necessary for the information processing device 2 to acquire the printing rule D1 from the print server 3. As a result, the initial determination result screen G1 may be displayed on the information processing device 2 much quicker than in the first and second preferred embodiments.

Everything is the same as the first preferred embodiment except for the above-described point.

(Modifications)

While the preferred embodiments of the present invention have been described above, the present invention is not limited to the preferred embodiments. Various modifications may be applied to the present invention.

In the present preferred embodiments described above, for example, if the user instruction to continue is given while the result of the initial determination is being displayed, the main determination is suspended when the main determination is ongoing. The main determination is not always suspended. Even when the user instruction to continue is given at the stage of the initial determination, the main determination may be continued. In this case, if the result of the main determination is the same as that of the initial determination, the process may be proceeded after the main determination without any change. The result of the main determination may differ from that of the initial determination. In such a case, it is determined if there is a possibility of producing the printed output in a way the user does not intend and the result of the main determination may be shown to the user again based on the determination result. It is assumed, for example, the printing rule which has not been finally determined at the initial determination is finally determined through the main determination. In this case, that change has no effect on the printing process. Thus, it is not necessary to show again the result of the main determination to the user. It is assumed, for example, the printing rule which is not the one to be applied according to the result of the initial determination is added as the one to be applied according to the result of the main determination. Moreover, it is assumed, for example, the printing rule which is the one to be applied according to the result of the initial determination is removed from the one to be applied according to the result of the main determination. In such cases, those changes may have effects on the printing process. The result of the main determination may be shown to the user again.

The image forming device 5 of the above-described preferred embodiments is shown to be one of MFPs. The image forming device 5 is not necessarily the device such as the MFPs. To be more specific, the image forming device 5 should include at least printing function. The image forming device 5 may be a printer.

The print server 3 of the above-described preferred embodiments is shown to be a server, for example. The print server 3 is not necessarily the device such as the server. To be more specific, the functions on the print server 3 as described above may be included as a part of functions on other devices (for instance, the information processing device 2 or the image forming device 5).

What is claimed is:

1. A printing system comprising an information processing device and a print server, a printing rule registered in advance with said print server being applied to a print job sent from said information processing device and a process defined in the printing rule being performed so that printing process being controlled, wherein
    said print server includes:
    a printing rule storing part for storing the printing rule; and
    a rule transmitting part for sending the printing rule stored in said printing rule storing part to said information processing device, and
    said information processing device includes:
    a display part on which a variety of information is displayed;
    a rule acquiring part for acquiring the printing rule sent from said print server;
    a job generating part for generating the print job containing job information and header information showing settings of the print job and sending the generated print job to said print server in response to a user instruction to print;
    an initial determination part for making an initial determination to determine whether or not the printing rule acquired by said rule acquiring part is applied to the print job generated by said job generating part based on the header information generated by said job generating part and displaying a result of the initial determination on said display part; and
    a job controlling part for continuing a process on the print job generated by said job generating part in response to a user instruction to continue when the user instruction to continue is given, and suspending the process on the print job generated by said job generating part in response to a user instruction to suspend when the user instruction to suspend is given after the result of the initial determination is displayed on said display part.

2. The printing system according to claim 1, wherein said job controlling part suspends a process to generate the print job or a process to send the print job to said print server by said job generating part in response to receiving the user instruction to suspend.

3. The printing system according to claim 1, wherein said information processing device further includes a main determination part for making a main determination to determine whether or not the printing rule acquired by said rule acquiring part is applied to the print job generated by said job generating part based on both the header information and the job information generated by said job generating part after the initial determination by said initial determination part.

4. The printing system according to claim 3, wherein said job controlling part suspends the main determination by said main determination part when the user instruction to continue or suspend is given during the main determination by said main determination part.

5. The printing system according to claim 4, wherein for suspending the main determination by said main determination part in response to the user instruction to continue, said job controlling part specifies the printing rule should be applied to the print job to said print server based on the user instruction to continue and the result of the initial determination by said initial determination part.

6. The printing system according to claim 3, wherein said main determination part displays the different result on said display part when the result of the main determination differs from that of the initial determination by said initial determination part.

7. The printing system according to claim 6, wherein said initial determination part displays the printing rule corresponding to the different result in a way different from other printing rules on said display part when the result of the main determination by said main determination part differs from that of the initial determination by said initial determination part.

8. The printing system according to claim 1, wherein said information processing device further includes an instruction part for receiving the instruction to continue or suspend by the user.

9. The printing system according to claim 1, wherein for displaying the result of the initial determination on said display part, said initial determination part adds and displays information showing that the printing rule to be applied to the print job generated by said job generating part is not finally determined.

10. The printing system according to claim 1, wherein for displaying the result of the initial determination on said display part, said initial determination part adds and displays information distinguishing the printing rule which is finally determined to be applied to the print job generated by said job generating part through the initial determination and the printing rule which is not finally determined to be applied to the print job generated by said job generating part through the initial determination.

11. The printing system according to claim 1, wherein the header information contains at least one of user information for identifying the user, document information relating to a document to print and print setting information relating to print settings specified by the user.

12. The printing system according to claim 1, wherein the printing rules includes multiple kinds of printing rules, and said initial determination part initially determines each kind of the printing rule to be applied to the print job.

13. The printing system according to claim 1, wherein said rule acquiring part acquires the printing rule from said print server and stores the acquired printing rule in a predetermined storage part at startup of said information processing device.

14. The printing system according to claim 1, wherein said rule acquiring part acquires the printing rule from said print server and stores the acquired printing rule in the predetermined storage part at startup of a certain application on said information processing device.

15. The printing system according to claim 13, wherein said rule acquiring part repeatedly acquires the printing rule from said print server every predetermined period of time and updates the printing rule in said predetermined storage part after storing the printing rule in said storage part.

16. The printing system according to claim 1, wherein said rule acquiring part acquires the printing rule from said print server in response to detecting the user instruction to print.

17. The printing system according to claim 16, wherein said rule acquiring part compares a print job sending time required for sending the printing job generated by said job generating part to the print server and a printing rule acquiring time required for acquiring the printing rule from said print server, and does not acquire the printing rule from said print server when the job sending time is shorter than the rule acquiring time, and
said initial determination part acquires the result of the initial determination from said print server and displays on said display part when the printing rule is not acquired by said rule acquiring part.

18. The printing system according to claim 15, wherein for acquiring the printing rule from said print server, said rule acquiring part acquires information as to the printing rule updated in said printing rule storage part between the previous and current acquisition and updates the previously acquired printing rule based on the information.

19. The printing system according to claim 1, wherein said rule transmitting part sends the printing rule stored in said printing rule storage part in response to addition, change or deletion of the printing rule stored in said printing rule storage part.

20. The printing system according to claim 1, wherein said rule transmitting part sends the printing rule stored in said printing rule storage part to said information processing device at startup of said print server.

21. The printing system according to claim 19, wherein said rule transmitting part sends the printing rule stored in said printing rule storage part to said information processing device every predetermined period of time after sending the printing rule stored in said printing rule storage part to said information processing device.

22. The printing system according to claim 1, wherein said rule transmitting part sends a part of the printing rules stored in said printing rule storage part excluding the printing rule which is not to be applied at the time of sending to said information processing device.

23. An information processing device sending a print job to a print server capable of controlling printing process by applying a printing rule to the print job, comprising:
a display part on which a variety of information is displayed;
a rule acquiring part for acquiring the printing rule from said print server;
a job generating part for generating the print job containing job information and header information showing settings of the print job and sending the generated print job to said print server in response to a user instruction to print;
an initial determination part for making an initial determination to determine whether or not the printing rule acquired by said rule acquiring part is applied to the print job generated by said job generating part based on the header information generated by said job generating part and displaying a result of the initial determination on said display part; and
a job controlling part for continuing a process on the print job generated by said job generating part in response to a user instruction to continue when the user instruction to continue is given, and suspending the process on the print job generated by said job generating part in response to a user instruction to suspend when the user instruction to suspend is given after the result of the initial determination is displayed on said display part.

24. The information processing device according to claim 23, wherein
said job controlling part suspends a process to generate the print job or a process to send the print job to said print server by said job generating part in response to receiving the user instruction to suspend.

25. The information processing device according to claim 23, further comprising:
a main determination part for making a main determination to determine whether or not the printing rule acquired by said rule acquiring part is applied to the print job generated by said job generating part based on both the header information and the job information generated by said job generating part after the initial determination by said initial determination part.

26. The information processing device according to claim 25, wherein
said job controlling part suspends the main determination by said main determination part when the user instruction to continue or suspend is given during the main determination by said main determination part.

27. A non-transitory computer readable recording medium on which a program is recorded, said program executable on an information processing device capable of sending a print job containing header information and job information to a print server capable of controlling a printing process by applying a printing rule to the print job, said program executed on said information processing device to function as a system comprising:
a rule acquiring part for acquiring the printing rule from said print server;
an initial determination part for acquiring the header information showing settings of the print job generated in response to a user instruction to print, making an initial determination to determine whether or not the printing rule acquired by said rule acquiring part is applied to the print job generated in response to the instruction to print based on the header information and displays a result of the initial determination on a predetermined display part; and
a job controlling part for continuing a process on the print job generated in response to the instruction to print when the user instruction to continue is given, and suspending the process on the print job generated in response to the instruction to print when the user instruction to suspend is given after the result of the initial determination is displayed on said display part.

* * * * *